US006975586B1

(12) United States Patent
Yoshimura

(10) Patent No.: US 6,975,586 B1
(45) Date of Patent: Dec. 13, 2005

(54) PROTECTION SWITCHING METHOD AND APPARATUS FOR PASSIVE OPTICAL NETWORK SYSTEM

(75) Inventor: Minoru Yoshimura, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/537,775

(22) Filed: Mar. 29, 2000

(30) Foreign Application Priority Data

Mar. 30, 1999 (JP) .................................. 11-087799
Aug. 18, 1999 (JP) .................................. 11-231313

(51) Int. Cl.⁷ .......................... G01R 31/08; H04L 1/22

(52) U.S. Cl. .................... 370/217; 370/227; 370/389; 370/407

(58) Field of Search ............................... 370/217–218, 370/227–228, 389, 392, 395.1, 398, 397, 370/400, 401, 407, 408–409, 425; 359/318

(56) References Cited

U.S. PATENT DOCUMENTS

| | | | | |
|---|---|---|---|---|
| 5,455,701 A | * | 10/1995 | Eng et al. ..................... | 398/54 |
| 5,838,924 A | * | 11/1998 | Anderson et al. ............. | 709/239 |
| 6,078,589 A | * | 6/2000 | Kuechler ..................... | 370/431 |
| 6,433,900 B1 | * | 8/2002 | Kuroyanagi et al. .......... | 398/19 |
| 6,580,688 B1 | * | 6/2003 | Klink .......................... | 370/220 |
| 6,674,715 B1 | * | 1/2004 | Yamada ....................... | 370/220 |

FOREIGN PATENT DOCUMENTS

| | | | | |
|---|---|---|---|---|
| EP | 0 828 400 A1 | 3/1998 | | |
| GB | 2289812 A | * 11/1995 | .......... | H04B 10/24 |
| JP | 4-162851 | 6/1992 | | |
| JP | 5-153053 | 6/1993 | | |
| JP | 7-336272 | 12/1995 | | |
| JP | 8-340335 | 12/1996 | | |
| JP | 9-107358 | 4/1997 | | |
| JP | 10-294753 | 11/1998 | | |

OTHER PUBLICATIONS

ITU-T Recommendation G.983.1 -Broadband Optical Access Systems Based on Passive Optical Networks (PON); Oct. 31, 1998, pp. 1-110.
European Search Report dated Apr. 28, 2005.

* cited by examiner

Primary Examiner—John Pezzlo
Assistant Examiner—Saba Tsegaye
(74) Attorney, Agent, or Firm—Whitham, Curtis & Christofferson P.C.

(57) ABSTRACT

In a protection switching method for a passive optical network system, a communication abnormality is detected in at least one active-system virtual path established between an optical line terminal and a subscriber terminal through a transmission path and a network unit. When a communication abnormality is detected in an active-system virtual path, a switch is controlled to switch the transmission paths to establish a standby-system virtual path between the optical line terminal and the subscriber terminal as a communication partner. A protection switching apparatus for a passive optical network system is also disclosed.

28 Claims, 26 Drawing Sheets

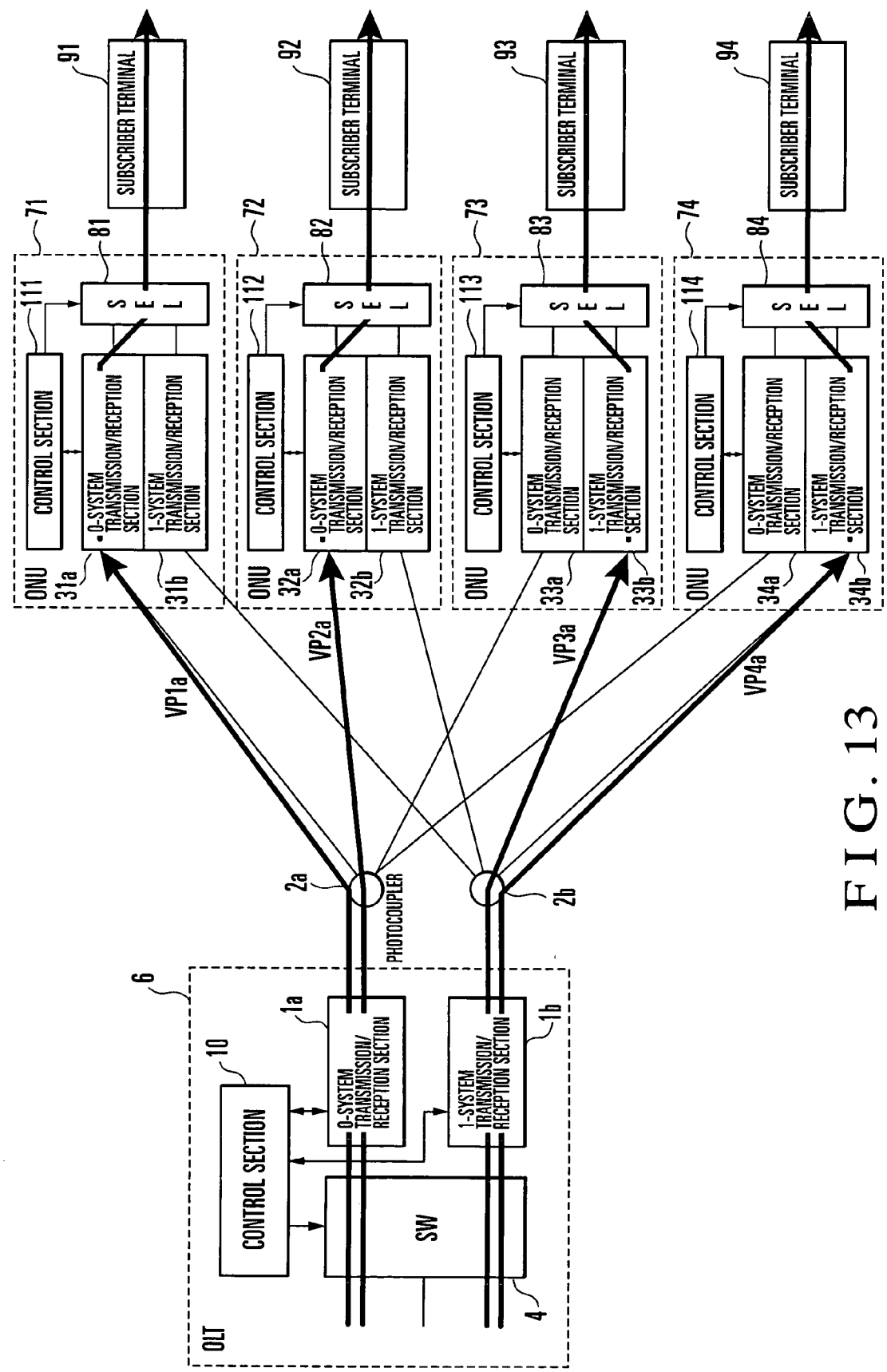
F I G. 13

PROTECTION SWITCHING METHOD AND APPARATUS FOR PASSIVE OPTICAL NETWORK SYSTEM

BACKGROUND OF THE INVENTION

The present invention relates to a protection switching method and apparatus for a PON (Passive Optical Network) system in which a plurality of ONUs (Optical Network Units) are star-connected to an OLT (Optical Line Terminal) through a photocoupler.

FIG. 24 shows the basic arrangement of a PON system.

As shown in FIG. 24, in an OLT 106, a transmission/reception section 101 is connected to a port of a switch (SW) 104, and the transmission/reception section 101 is connected to transmission/reception sections 103-1 to 103-n of a plurality of ONUs 107-1 to 107-n through a photocoupler 102 and optical fibers 112-1 to 112-n. The ONUs 107-1 to 107-n are star-connected to the single OLT 106.

The transmission/reception sections 103-1 to 103-n of the ONUs 107-1 to 107-n are respectively connected to subscriber terminals 109-1 to 109-n. When the transmission/reception section 101 of the OLT 106 is to communicate with one of the subscriber terminals 109-1 to 109-n, a control section 110 of the OLT 106 controls switching operation of the switch 104. With this operation, identical signals are distributed from the photocoupler 102 to the ONUs 107-1 to 107-n through the optical fibers 112-1 to 112-n, and one of the ONUs 107-1 to 107-n extracts the signal upon determining that the signal is self-addressed.

Assume that the ONU 107-1 determines that the signal is self-addressed. In this case, when a virtual path is established between the subscriber terminal 109-1 and the transmission/reception section 101 of the OLT 106, the transmission/reception section 101 of the OLT 106 can communicate with the subscriber terminal 109-1. That is, the transmission/reception section 101 of the OLT 106 can communicate with the subscriber terminal 109-1 through the photocoupler 102, optical fibers 112-1 to 112-n, and the transmission/reception section 103-1 of the ONU 107-1.

FIG. 25 shows a dual arrangement designed to ensure the reliability of a PON system having such an arrangement. In the dual arrangement shown in FIG. 25, an OLT 106 has sections of two systems, i.e., a 0-system transmission/reception section 101a and 1-system transmission/reception section 101b. Likewise, ONUs 107-1 to 107-n respectively have sections of two systems, i.e., 0-system transmission/reception sections 103-1a to 103-na and 1-system transmission/reception sections 103-1b to 103-nb. In order to implement two systems in this manner, the OLT 106 has a selector (SEL) 105 in addition to a switch 104 and control section 110.

The SEL 105 selectively switches between the 0-system transmission/reception section 101a and 1-system transmission/reception section 101b to connect the 0-system transmission/reception section 101a to the 0-system transmission/reception sections 103-1a to 103-na of the ONUs 107-1 to 107-n through a photocoupler 102a and optical fibers 112-1a to 112-na. In addition, the 1-system transmission/reception section 101b of the OLT 106 is connected to the 1-system transmission/reception sections 103-1b to 103-nb of the ONUs 107-1 to 107-n through optical fibers 112-1b to 112-nb.

The 0-system transmission/reception sections 103-1a to 103-na and 1-system transmission/reception sections 103-1b to 103-nb of the ONUs 107-1 to 107-n are respectively selected by SELs 108-1 to 108-n of the ONUs 107-1 to 107-n in accordance with selection of 0-system or 1-system by the SEL 105 of the OLT 106. The selected 0-system transmission/reception sections 103-1a to 103-na or 1-system transmission/reception sections 103-1b to 103-nb are respectively connected to subscriber terminals 109-1 to 109-n.

Assume that the PON system is operating with the 0-system transmission/reception section 101a and 0-system transmission/reception sections 103-1a to 103-na belonging to an active system, and the 1-system transmission/reception section 101b and 1-system transmission/reception sections 103-1b to 103-nb belonging to a standby system.

Note that the terms "0-system" and "1-system" are added to physically identify the respective sections. However, the 0-system transmission/reception section 101a and 0-system transmission/reception sections 103-1a to 103-na do not always belong to the active system, and the 1-system transmission/reception section 101b and 1-system transmission/reception sections 103-1b to 103-nb do not always belong to the standby system. That is, the 0-system and 1-system are irrelevant to the active and standby systems. The active system is a currently used system, and the standby system is a system that is used upon switching from the active system.

Assume that the 0-system is an active system in the following description. Referring to FIG. 25, the 0-system transmission/reception section 101a of the OLT 106 is now capable of communicating with the subscriber terminals 109-1 to 109-n through the photocoupler 102a, the 0-system transmission/reception sections 103-1a to 103-na and SELs 108-1 to 108-n of the ONUs 107-1 to 107-n. Assume that a virtual path is established between the subscriber terminal 109-1 and the 0-system transmission/reception section 101a of the OLT 106 through the photocoupler 102a and transmission/reception section 103-1a and SEL 108-1 of the ONU 107-1, and the 0-system transmission/reception section 101a is now communicating with the subscriber terminal 109-1.

When an abnormality occurs in the virtual path between the subscriber terminal 109-1 and the 0-system transmission/reception section 101a of the OLT 106 during this communication owing to some cause, no data is transmitted from the subscriber terminal 109-1 to the 0-system transmission/reception section 101a of the OLT 106. As a result, the 0-system transmission/reception section 101a detects the occurrence of the abnormality in the virtual path, and sends a warning signal to the control section 110.

Upon reception of the warning signal, the control section 110 outputs a switching instruction to the SEL 105 to switch from the 0-system transmission/reception section 101a to the 1-system transmission/reception section 101b. With this operation, all the virtual paths between the OLT 106 and subscriber terminals 109-1 to 109-n are switched to the 1-system at once. That is, virtual paths are established between the 1-system transmission/reception section 101b of the OLT 106 and the subscriber terminals 109-1 to 109-n through the photocoupler 102b, optical fibers 112-1b to 112-nb, and the 1-system transmission/reception sections 103-1b to 103-nb and SELs 108-1 to 108-n of the ONUs 107-1 to 107-n.

With this operation, the communication between the OLT 106 and the subscriber terminal 109-1, which has been interrupted due to the occurrence of the abnormality, is resumed upon switching to the virtual path constituted by the 1-system transmission/reception section 101b, photocoupler 102b, optical fiber 112-1b, and 1-system transmission/reception section 103-1b and SEL 108-1 of the ONU 107-1.

FIG. 26 shows another example of the dual arrangement of a conventional OPN system.

In the arrangement shown in FIG. 26, control sections 111-1 to 111-n are added to the ONUs 107-1 to 107-n in FIG. 25. These control sections 111-1 to 111-n control SELs 108-1 to 108-n to switch (select) between 0-system transmission/reception sections 103-1a to 103-na and 1-system transmission/reception sections 103-1b to 103-nb. Since the arrangement of the remaining portion is the same as that in FIG. 25, the same reference numerals as in FIG. 25 denote the same parts in FIG. 26, and a description thereof will be omitted.

Assume that as in the case shown in FIG. 25, a fault has occurred in one of the following components of the 0-system: a transmission/reception section 101a, photocoupler 102a, optical fibers 112-1a to 112-na, and the transmission/reception sections 103-1a to 103-na of ONUs 107-1 to 107-n, while the PON system is operating with the 0-system serving as an active system, and the 1-system serving as a standby system.

The 0-system transmission/reception section 101a always monitors signals between the OLT 106 and ONUs 107-1 to 107-n, and notifies a control section 110 of the OLT 106 of an abnormality upon detecting a signal abnormality. Upon reception of the abnormality notification, the control section 110 outputs a switching command to an SEL 105 of the OLT 106 to switch the transmission path from the 0-system to the 1-system. As a consequence, connection between the OLT 106 and the ONUs 107-1 to 107-n is restored by using the 1-system optical transmission path.

Upon outputting the switching command to the SEL 105, the control section 110 outputs switching commands to the ONUs 107-1 to 107-n through the 1-system connection, i.e., the SEL 105-1, 1-system transmission/reception section 101b, photocoupler 102b, and the 1-system transmission/reception sections 103-1b to 103-nb of the ONUs 107-1 to 107-n. With this operation, the control sections 111-1 to 111-n of the ONUs 107-1 to 107-n control switching operation of the SELs 108-1 to 108-n to restore the transmission paths to subscriber terminals 109-1 to 109-n.

In each of the dual arrangements of the conventional PON systems shown in FIGS. 25 and 26, however, even if a fault occurs in only the transmission/reception 103-1a of the 0-system ONU 107-1, which is part of the PON system, the overall PON system must be simultaneously switched from the 0-system to the 1-system in order to restore a path under communication. That is, switching is performed even for the ONUs 107-2 to 107-n that are operating normally. As a result, the communication quality deteriorates due to short breaks and the like caused in this operation.

In each of the arrangements of the conventional PON systems shown in FIGS. 25 and 26, the active and standby systems are physically discriminated from each other, and the standby system cannot be used until it is selected by the SEL 105. In addition, the active system is switched to the standby system by only interchanging the physical transmission paths, and only the same connection as the preceding connection is restored.

A star type light subscriber transmission device using a star coupler is disclosed in Japanese Patent Laid-Open No. 05-153053 (reference 1). According to reference 1, a fault detection circuit and fault detection signal generation circuit are connected to the terminal on an N branching side of the star coupler having a branching of 2: N via an optical directional coupler. A first-station-side light subscriber transmission device is connected to one terminal of the branching side of the star coupler, and a fault detection signal extraction circuit and a second-station-side light subscriber transmission device are connected to the other terminal via an optical branching device. The first- and second-station-side light subscriber transmission devices are switched and controlled by a selection circuit which received the output signal from the fault detection signal extraction circuit.

A dual changeover system using a star coupler is disclosed in Japanese Patent Laid-Open No. 10-294753 (reference 2). According to reference 2, a phase difference calculation means calculates a reception phase difference between an active-system transmission/reception section and a standby-system transmission/reception section of a subscriber-side device while the reception states of the active-system transmission/reception section and standby-system transmission/reception section are normal. A pointer control means then calculates a standby-system transmission phase by using the calculated reception phase difference and the active-system transmission phase.

In references 1 and 2, there is no description about switching of only a virtual path having undergone a fault to the standby system, and there is provided no solution to the above problem associated with switching of normal virtual paths.

SUMMARY OF THE INVENTION

It is an object of the present invention to provide a protection switching method and apparatus for a PON system, which can easily switch only a path to be restored to a standby-system path without affecting communication through normal virtual paths in the PON system.

In order to achieve the above object, according to the present invention, there is provided a protection switching method for a passive optical network system including an optical line terminal for switching between a first active-system transmission/reception section and a first standby-system transmission/reception section by using a switch, a plurality of network units for selectively connecting second active-system transmission/reception sections and second standby-system transmission/reception sections to subscriber terminals upon switching the sections through selectors in the event of a communication abnormality, and transmission paths for star-connecting the second active-system transmission/reception sections to the first active-system transmission/reception section, and also star-connecting the second standby-system transmission/reception sections to the first standby-system transmission/reception section, comprising the steps of detecting a communication abnormality in at least one active-system virtual path established between the optical line terminal and the subscriber terminal through the transmission path and the network unit, and upon detection of a communication abnormality in the active-system virtual path, causing the switch to switch the transmission paths to establish a standby-system virtual path between the optical line terminal and the subscriber terminal serving as a communication partner.

BRIEF DESCRIPTION OF THE DRAWINGS

FIG. 13 is a block diagram showing the third virtual path setting example in the protection switching apparatus in FIG. 10;

DESCRIPTION OF THE PREFERRED EMBODIMENTS

The present invention will be described in detail below with reference to the accompanying drawings.

Figure 1:
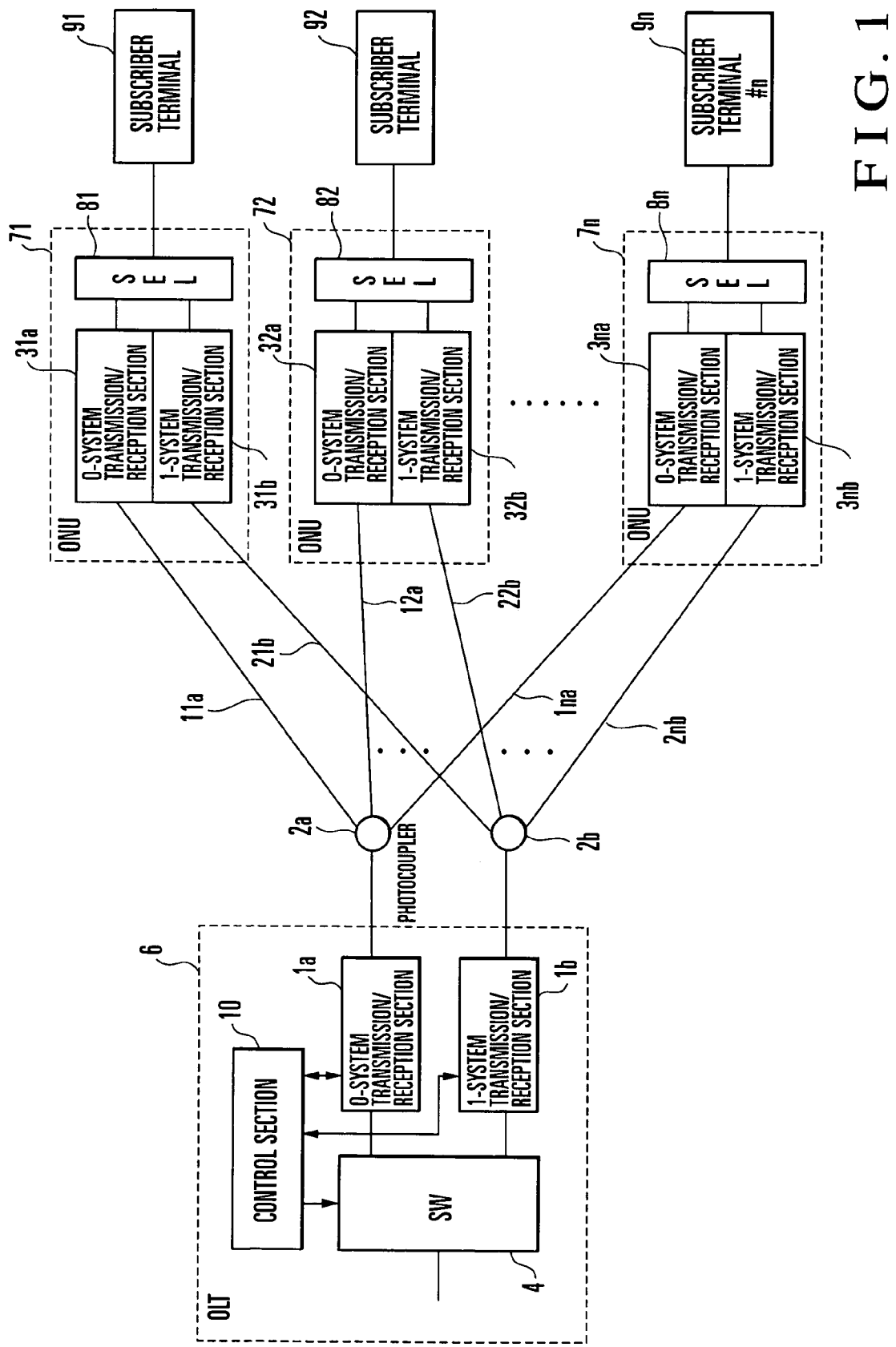
FIG. 1 is block diagram showing a protection switching apparatus for a PON system according to the first embodiment of the present invention.

FIG. 1 shows a protection switching apparatus for a PON system according to the first embodiment of the present invention. Referring to FIG. 1, an OLT 6 incorporates a switch 4, 0-system transmission/reception section 1a, and 1-system transmission/reception section 1b.

The 0-system transmission/reception section 1a and 1-system transmission/reception section 1b detect the communication states of virtual paths established between the OLT 6 and subscriber terminals 91 to 9n connected to ONUs (Optical Network Units) 71 to 7n, and send warning signals to a control section 10. The 0-system transmission/reception section 1a and 1-system transmission/reception section 1b are connected to different ports of the switch 4. The switch 4 switches virtual paths to be established under the control of the control section 10. The switch 4 and control section 10 constitute a virtual path establishment switching means.

Assume that virtual paths constitute an ATM (Asynchronous Transfer Mode) PON in this embodiment. Note that a virtual path is a bundle of virtual channels, and switching of connections using virtual channels can be executed in the same manner as described above.

The 0-system transmission/reception section 1a and 1-system transmission/reception section 1b are respectively connected to photocouplers 2a and 2b. The photocoupler 2a is connected to 0-system transmission/receptions 31a to 3na of the ONUs 71 to 7n through optical fibers 11a to 1na. That is, the ONUs 71 to 7n are star-connected to the photocoupler 2a (the 0-system transmission/reception section 1a of the OLT 6). Likewise, the photocoupler 2b is connected to 1-system transmission/receptions 31b to 3nb of the ONUs 71 to 7n through optical fibers 21b to 2nb. That is, the ONUs 71 to 7n are star-connected to the photocoupler 2b (1-system transmission/reception section 1b of the OLT 6).

The ONUs 71 to 7n respectively include SELs 81 to 8n for making connection to the subscriber terminals 91 to 9n by switching from the 0-system transmission/receptions 31a to 3na to the 1-system transmission/receptions 31b to 3nb (or switching in the reverse direction) in accordance with switching request signals transmitted from the OLT 6. Switching request signals from the OLT 6 are sent from the control section 10 to the ONUs 71 to 7n through the optical fibers 11a to 1na or optical fibers 21b to 2nb at the time of virtual path switching control by the switch 4.

Figure 2:
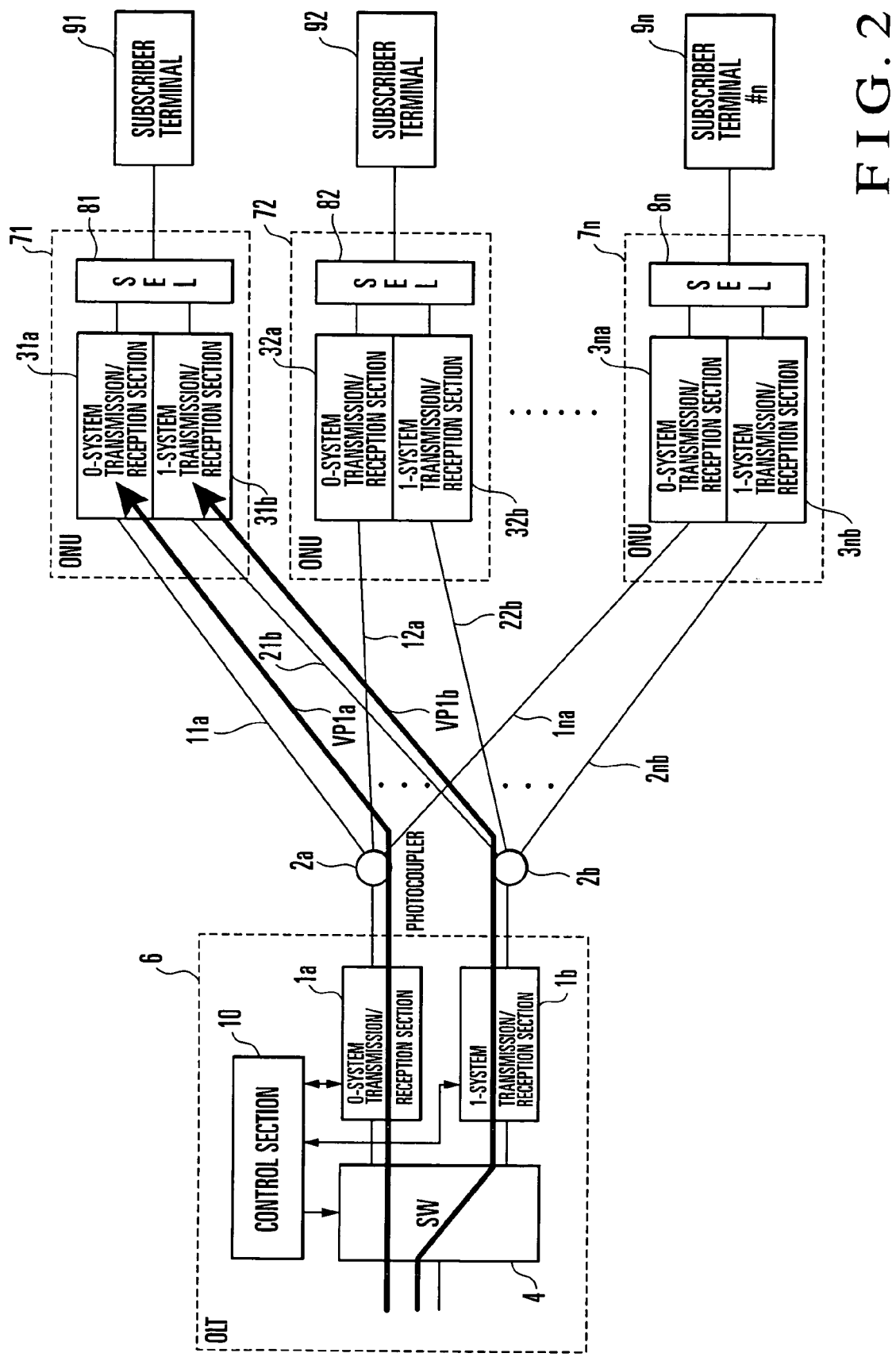
FIG. 2 is a block diagram showing virtual paths established between an OLT and subscriber terminals in the protection switching apparatus in FIG. 1.

The operation of the protection switching apparatus having the above arrangement will be described next, assuming that the 0-system and 1-system respectively serve as an active system and standby system. FIG. 2 shows a case wherein a virtual path is established to allow communication between the subscriber terminal 91 and the OLT 6.

Referring to FIG. 2, when the 0-system transmission/reception section 1a of the OLT 6 is connected to the 0-system transmission/reception section 31a of the ONU 71 through the photocoupler 2a and optical fiber 11a, a virtual path VP1a is established between the subscriber terminal 91 and the 0-system transmission/reception section 1a of the OLT 6 in accordance with the setting of the switch 4. When the 1-system transmission/reception section 1b of the OLT 6 is connected to the 1-system transmission/reception section 1b of the ONU 71 through the photocoupler 2b and optical fiber 21b, a virtual path VP1b is established between the subscriber terminal 91 and the 1-system transmission/reception section 1b of the OLT 6 in accordance with the setting of the switch 4.

In the case shown in FIG. 2, the subscriber terminal 91 can communicate with either the 0-system transmission/reception section 1a or the 1-system transmission/reception section 1b of the OLT 6.

Switching operation from an active-system virtual path under normal communication operation to a standby-system virtual path will be described next with reference to FIG. 3.

Figure 3:
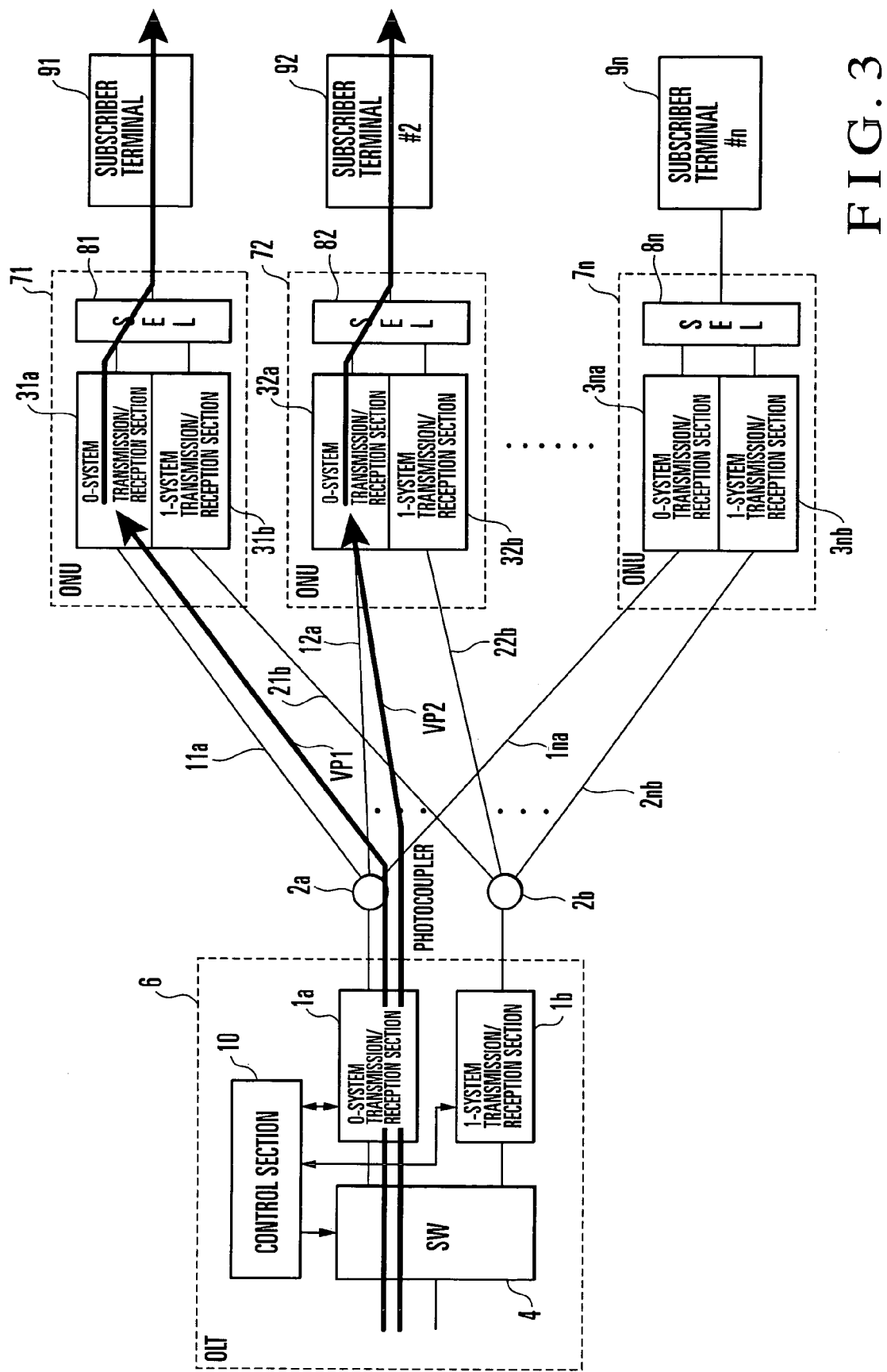
FIG. 3 is a block diagram showing a normal established state of virtual paths between the OLT and a plurality of subscriber terminals in the protection switching apparatus in FIG. 1.

Referring to FIG. 3, the bold lines indicate established virtual paths VP1 and VP2. The virtual path VP1 is established by the following route: switch 4—0-system transmission/reception section 1a of the OLT 6—photocoupler 2a—optical fiber 11a—0-system transmission/reception section 31a of the ONU 71—SEL 81—subscriber terminal 91. Communication is performed between the subscriber terminal 91 and the 0-system transmission/reception section 1a of the OLT 6 through the virtual path VP1.

The virtual path VP2 is established by the following route: switch 4—0-system transmission/reception section 1a of the OLT 6—photocoupler 2a—optical fiber 12a—0-system transmission/reception section 32a of the ONU 72—SEL 82—subscriber terminal 92. Communication is performed between the 0-system transmission/reception section 1a and the subscriber terminal 92 through the virtual path VP2.

Referring to FIG. 3, therefore, the virtual path VP1 takes charge of communication between the OLT 6 and the subscriber terminal 91, and the virtual path VP2 takes charge of communication between the OLT 6 and the subscriber terminal 92.

Figure 4:
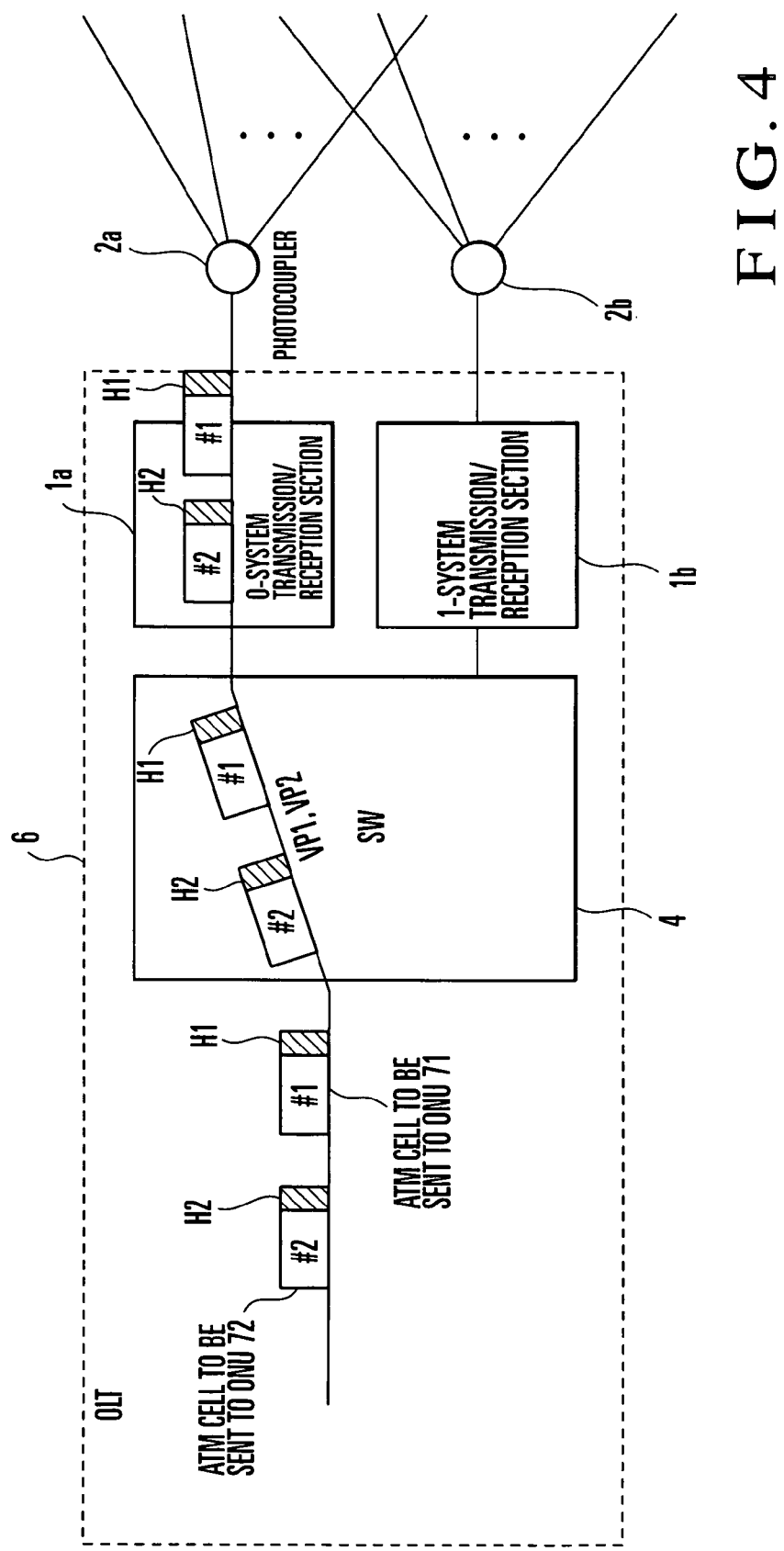
FIG. 4 is a block diagram for explaining the flows of ATM signals in the normal established state in FIG. 3.

In such a normal communication state, the switch 4 operates in the manner shown in FIG. 4. Referring to FIG. 4, ATM cell #1 to be transmitted to the ONU 71 is transmitted to the 0-system transmission/reception section 31a of the ONU 71 through the switch 4, 0-system transmission/reception section 1a, photocoupler 2a, and virtual path VP1. ATM cell #2 to be transmitted to the ONU 72 is transmitted to the 0-system transmission/reception section 32a of the ONU 72 through the switch 4, 0-system transmission/reception section 1a, photocoupler 2a, and virtual path VP2.

In this case, both ATM cells #1 and #2 pass through the 0-system transmission/reception section 1a of the OLT 6. In accordance with the values of headers H1 and H2 of ATM cells #1 and #2, the switch 4 outputs ATM cells #1 and #2 to the corresponding ports.

Figure 5:
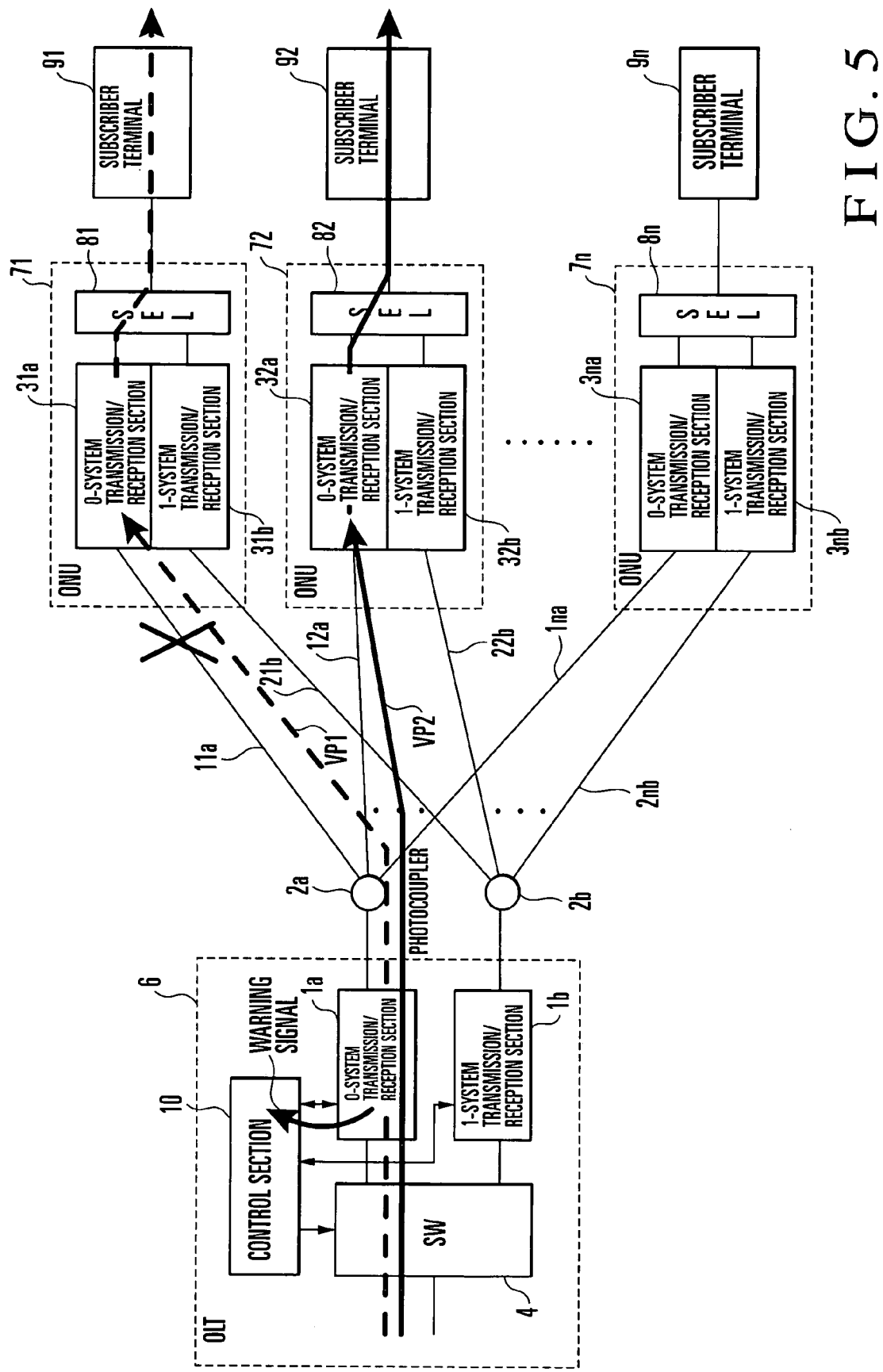
FIG. 5 is a block diagram showing a state wherein an abnormality has occurred in a virtual path (VP1) in the normal established state in FIG. 3.

When an abnormality (e.g., disconnection) occurs in the virtual path VP1 between the 0-system transmission/reception section 31a of the ONU 71 and the photocoupler 2a as indicated by an "X" in FIG. 5 in the above normal communication state, only a signal from the ONU 71 does not arrive at the 0-system transmission/reception section 1a of the OLT 6. The 0-system transmission/reception section 1a of the OLT 6 therefore detects an abnormality in the communication state of the virtual path VP1, and sends a warning signal to the control section 10.

Figure 6:
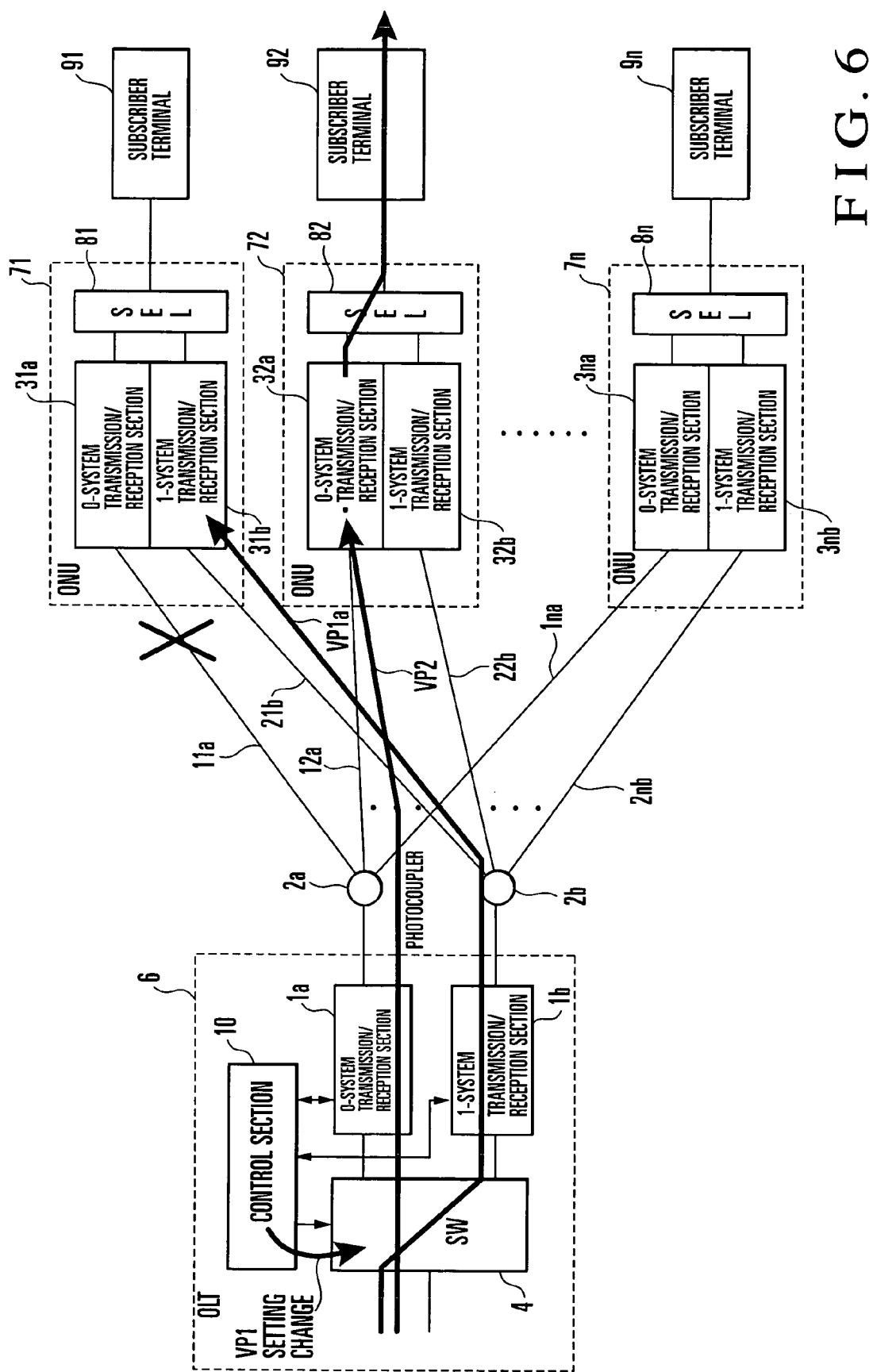
FIG. 6 is a block diagram showing a state wherein a new virtual path (VP2a) is established from the abnormal state in FIG. 5.

Upon reception of the warning signal, the control section 10 controls the switch 4 to change the setting of the virtual path. With this operation, the switch 4 switches the virtual path VP1 to the virtual path VP1a, as shown in FIG. 6. That is, the virtual path VP1a is established by the following route: 1-system transmission/reception section 1b of the OLT 6—photocoupler 2b—optical fiber 21b—1-system transmission/reception section 31b of the ONU 71. As a consequence, the communication between the OLT 6 and the ONU 71 is resumed.

At this time, the virtual path VP2 is kept used for the communication between the OLT 6 and the ONU 72 without being affected.

Figure 7:
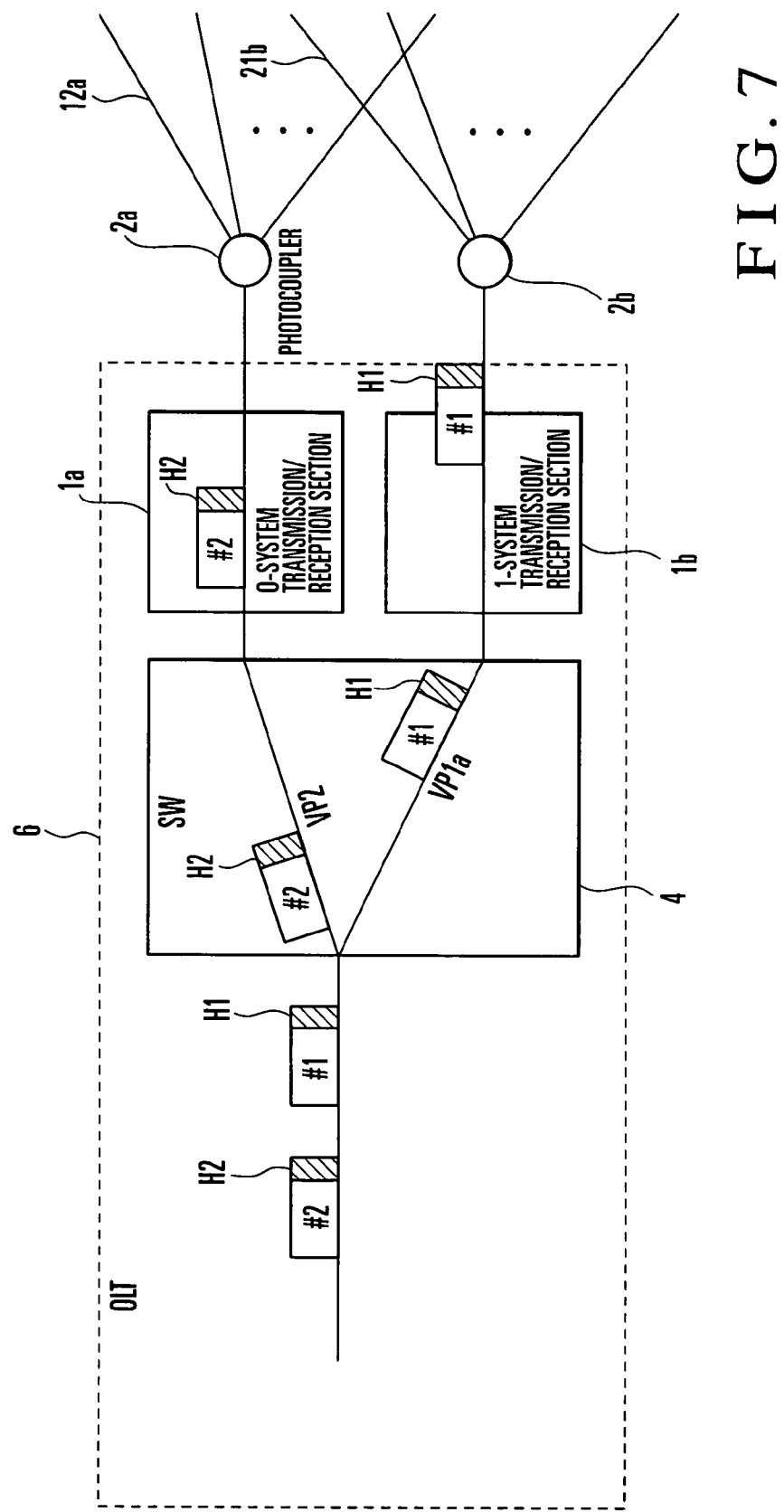
FIG. 7 is a block diagram showing the flows of ATM signals in the established state of the new virtual path (VP2a) in FIG. 6.

FIG. 7 shows the flows of signals through the switch 4 at the time of switching from the virtual path VP1 to the virtual path VP1a in FIG. 6.

Referring to FIG. 7, in accordance with the setting of a virtual path with respect to the switch 4, ATM cell #1 to be transmitted to the ONU 71 is transmitted to the virtual path VP1a formed by the following route: switch 4—1-system transmission/reception section 1b of the OLT 6—photocoupler 2b—optical fiber 21b. ATM cell #2 to be transmitted to the ONU 72 is transmitted to the virtual path VP2 formed by the following route: switch 4—0-system transmission/reception section 1a of the OLT 6—photocoupler 2a—optical fiber 12a—1-system transmission/reception section 32a of the ONU 72.

In this case, in accordance with the values of the headers H1 and H2 added to ATM cells #1 and #2, ATM cells #1 and #2 are distributed to the corresponding ports of the switch 4.

The operation of the SEL 81 of the ONU 71 at the time of the above switching from the virtual path VP1 to the virtual path VP1a will be described next with reference to FIG. 8.

Figure 8:
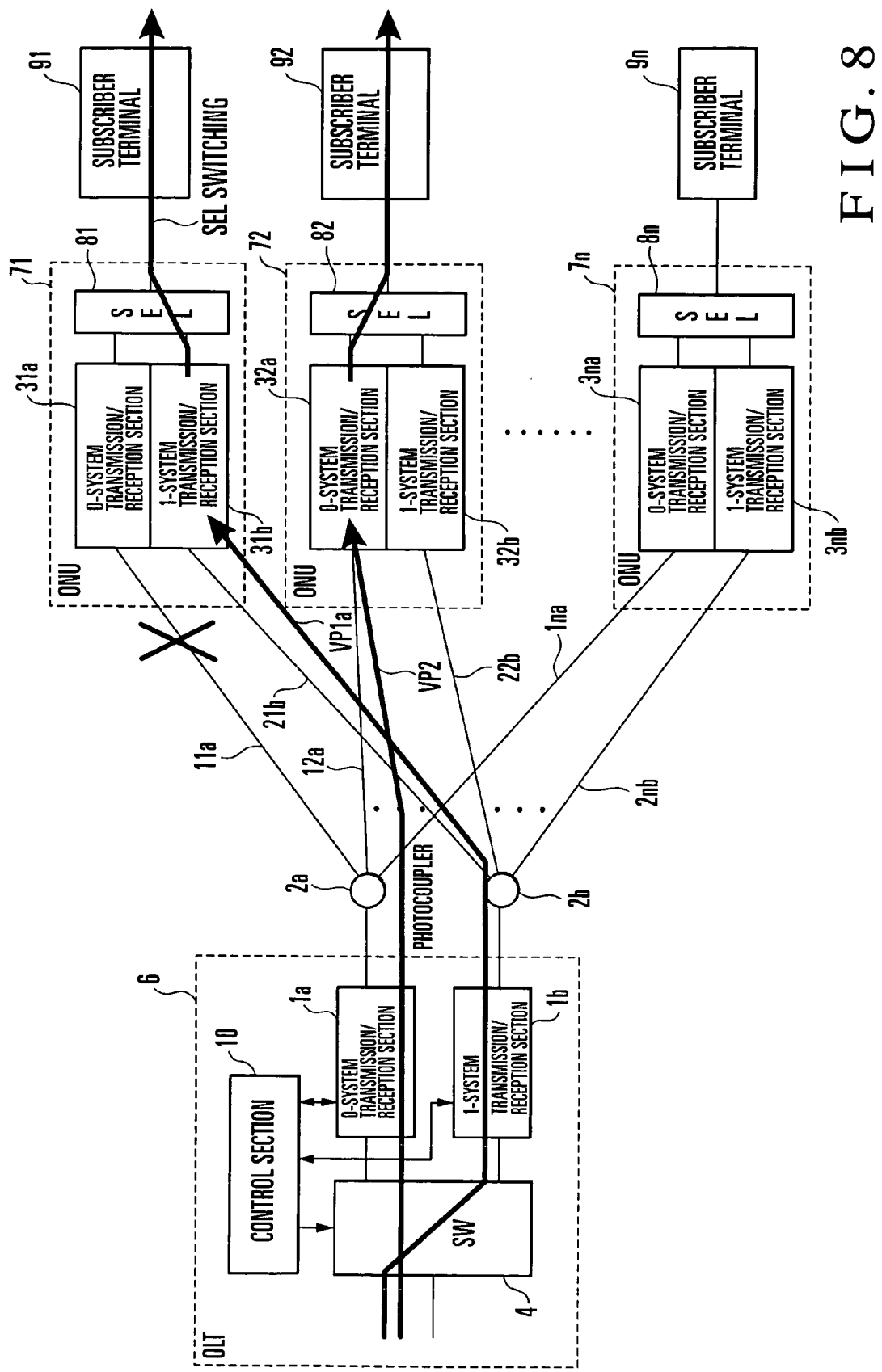
FIG. 8 is a block diagram showing the operation of a selector of an ONU at the time of switching to the new virtual path (VP2a) in FIG. 6.

Referring to FIG. 8, the control section 10 transmits a switching request signal for the SEL 81 to the ONU 71 through the virtual path VP1a established by the control operation of the switch 4. Upon reception of the switching request signal from the OLT 6, the ONU 71 selects and connects the SEL 81 through the 1-system transmission/reception section 31b, thus connecting the subscriber terminal 91 to the 1-system transmission/reception section 31b through the SEL 81.

With this operation, a signal from the 1-system transmission/reception section 31b of the ONU 71 is transmitted to the subscriber terminal 91 through the SEL 81. As a result, the communication between the OLT 6 and the subscriber terminal 91 is resumed through the virtual path VP1a.

Figure 9:
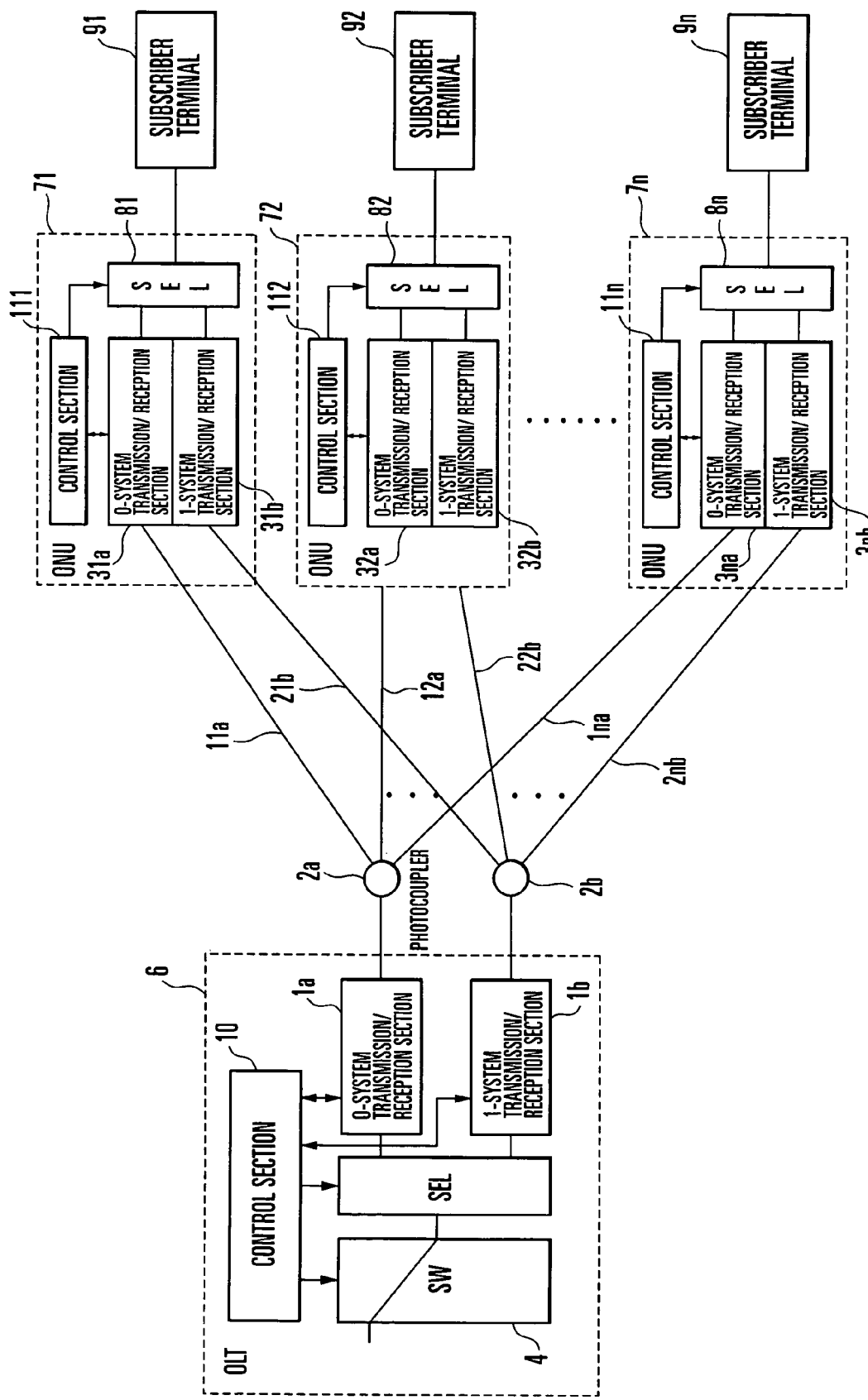
FIG. 9 is a block diagram showing a protection switching apparatus for a PON system according to the second embodiment of the present invention.

FIG. 9 shows a protection switching apparatus for a PON system according to the second embodiment of the present invention. The same reference numerals as in FIG. 1 denote the same parts in FIG. 9.

The arrangement of an OLT 6 in FIG. 9 is the same as that in FIG. 1. In the OLT 6, a 0-system transmission/reception section 1a and 1-system transmission/reception section 1b are connected to different ports of a switch 4. The 0-system transmission/reception section 1a of the OLT 6 is connected to a photocoupler 2a and connected to 0-system transmission/receptions 31a to 3na of ONUs 71 to 7n through the photocoupler 2a and optical fibers 11a to 11na. The 1-system transmission/reception section 1b of the OLT 6 is connected to a photocoupler 2b and connected to 1-system transmission/receptions 31b to 3nb of the ONUs 71 to 7n through the photocoupler 2b and optical fibers 21b to 2nb.

In this connection arrangement, the 0-system transmission/reception section 1a of the OLT 6 exchanges signals with the 0-system transmission/receptions 31a to 3na of the ONUs 71 to 7n. The photocoupler 2a branches an optical signal from the 0-system transmission/reception section 1a into signals to the optical fibers 11a to 11na so as to transmit them to the 0-system transmission/receptions 31a to 3na in the ONUs 71 to 7n. Likewise, the 1-system transmission/reception section 1b of the OLT 6 exchange signals with the 1-system transmission/receptions 31b to 3nb of the ONUs 71 to 7n. The photocoupler 2b branches an optical signal from the 1-system transmission/reception section 1b into signals to the optical fibers 21b to 2nb so as to transmit them to the 1-system transmission/receptions 31b to 3nb of the ONUs 71 to 7n.

The ONUs 71 to 7n respectively incorporate SELs 81 to 8n as in the arrangement shown in FIG. 1. The SELs 81 to 8n select signals from the 0-system transmission/receptions 31a to 3na or 1-system transmission/receptions 31b to 3nb and output them to subscriber terminals 91 to 9n. The 0-system transmission/reception section 1a and 1-system transmission/reception section 1b of the OLT 6 have the function of always monitoring signals. With this function, each of the 0-system transmission/reception section 1a and 1-system transmission/reception section 1b detects an abnormality in a transmission path and notifies the control section 10 of the abnormality.

Upon reception of the abnormality from the 0-system transmission/reception section 1a or 1-system transmission/reception section 1b, the control section 10 outputs a switching control signal to the switch 4. Upon reception of the switching control signal from the control section 10, the switch 4 discriminates header information, and outputs an input ATM cell to a corresponding port.

The ONUs 71 to 7n respectively incorporate controls sections 111 to 11n. The 0-system transmission/receptions 31a to 3na and 1-system transmission/receptions 31b to 3nb of the ONUs 71 to 7n notify the controls sections 111 to 11n of switching request signals transmitted from the OLT 6 through transmission paths. Upon notification of the switching request signals, the controls sections 111 to 11n perform switching control on the SELs 81 to 8n.

Figure 10:
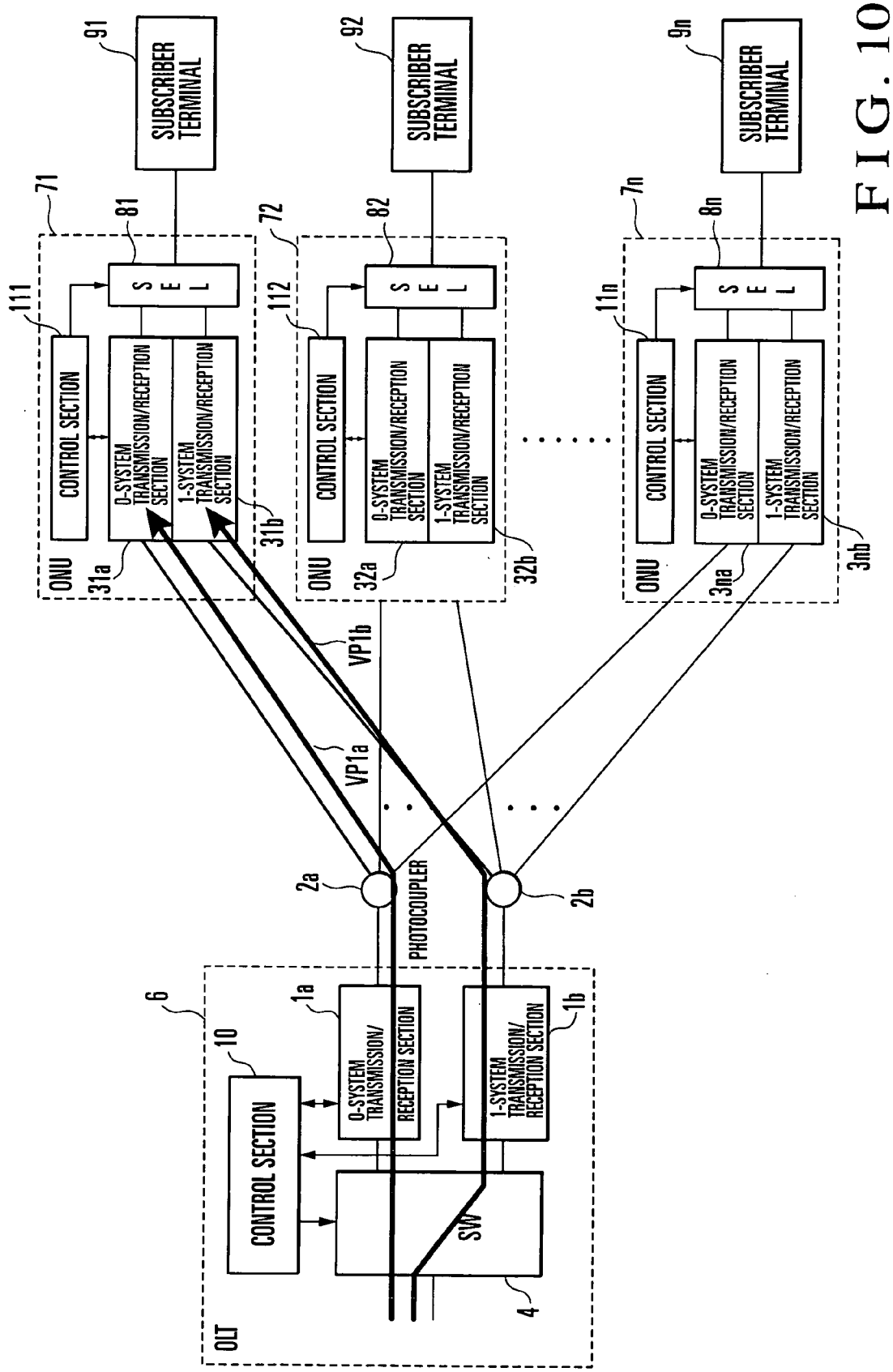
FIG. 10 is a block diagram showing virtual paths established between an OLT and subscriber terminals in the protection switching apparatus in FIG. 9.

As shown in FIG. 10, therefore, when a virtual path is to be established to exchange signals with the subscriber terminal 91 through the ONU 71, a route running through the 0-system transmission/reception section 1a of the OLT 6, i.e., a virtual path VP1a, and a route running through the 1-system transmission/reception section 1b of the OLT 6, i.e., virtual path VP1b, can be selectively used.

With this arrangement, therefore, when any one of the transmission elements constituting the active-system virtual path fails, the standby-system virtual path is selected by switching the virtual paths at the switch 4, thereby resuming the communication with the target subscriber through a transmission path that is physically different from the faulty path.

Since the 0-system transmission/reception section 1a and 1-system transmission/reception section 1b are connected to different ports of the switch 4 in the OLT 6, the two virtual paths VP1a and VP1b can be set to have different bands. In addition, since the resources of the two systems, i.e., the 0-system and 1-system, can be selectively used, one of the systems through which an active virtual path is to be established can be arbitrarily determined. By using these features, flexible network design like that described below can be realized.

In the first example of this case, a standby-system virtual path having a band narrower than that of an active-system virtual path is prepared through one route, and the remaining band is used for services. By setting a limitation that minimum services are ensured in the event of a fault in this manner, the total band allocated to the physical resources of the 0-system and 1-system is effectively distributed. This makes it possible to use a broader band for services than in a case wherein the resources of only one system are fully used.

In the second example, since faults do not always occur in all virtual paths in operation at once, there is no need to always ensure a band for setting standby-system virtual paths for all the active-system virtual paths. That is, a given band is ensured as a common standby band for all virtual paths in operation, and is used for only a virtual path having undergone a fault to set a standby-system virtual path.

This makes it possible to broaden the band that can be used for services as compared with a case wherein a band is ensured for standby-system virtual paths in a one-to-one correspondence with all active-system virtual paths. If a band broader than the common standby-system band is required in case faults have occurred in a plurality of virtual paths at once, the band for virtual paths in normal operation is limited to ensure a necessary band for virtual paths.

In the third example, no band for setting standby-system virtual paths is ensured during normal operation, and a maximum band allowed for physical resources is used for services. A band for other normal virtual paths is limited in the even of a fault to ensure a band necessary for standby-system virtual paths, thus establishing standby-system virtual paths.

In the fourth example, a single system accommodates subscribers who require no dual protection and subscribers who requires dual protection.

The operation of the second embodiment having this arrangement will be described next. For the sake of simplicity, assume that the number of ONUs is four, i.e., n=4.

Figure 11:
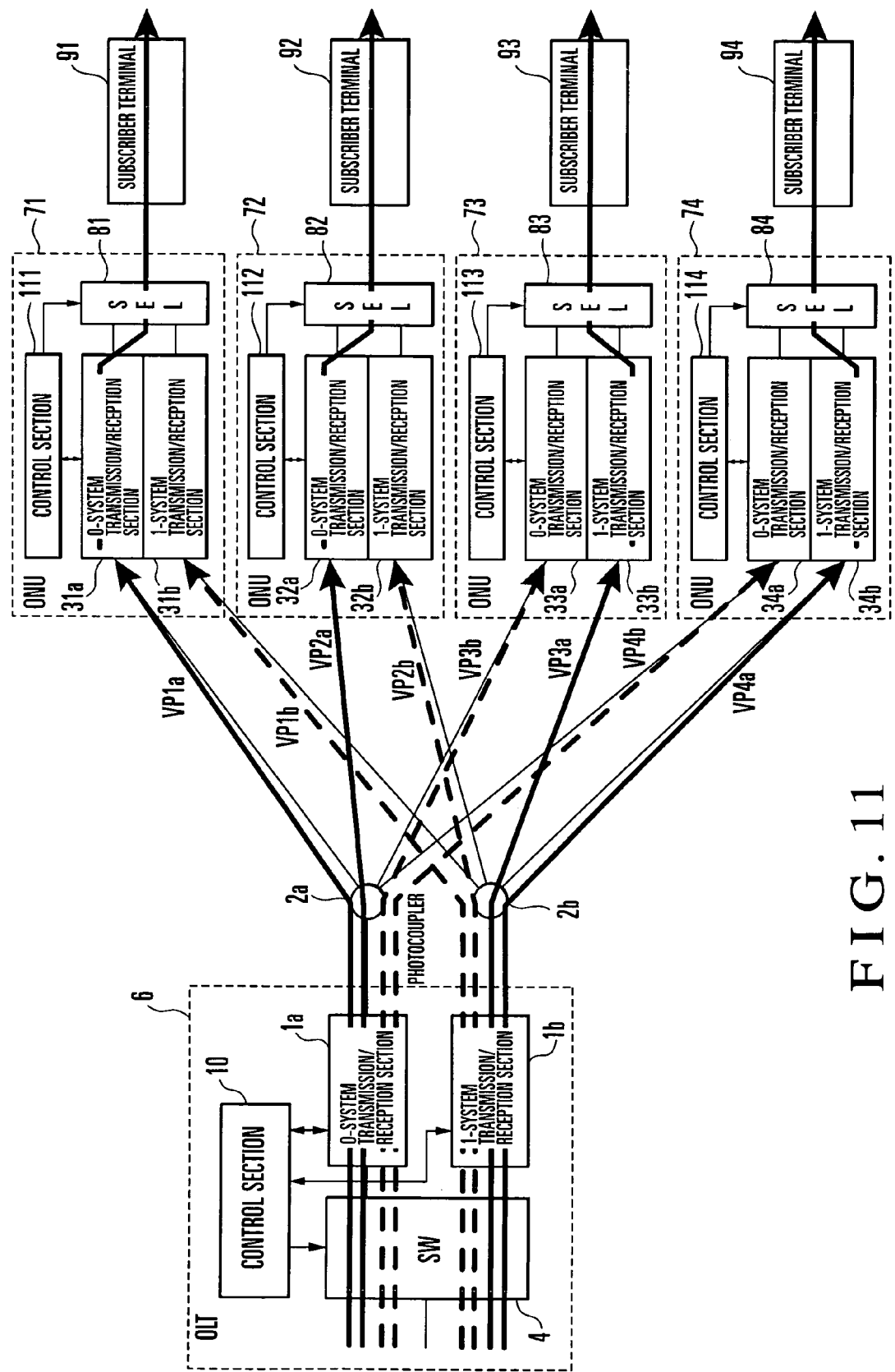
FIG. 11 is a block diagram showing the first virtual path setting example in the protection switching apparatus in FIG. 10.

FIG. 11 shows an example of how a first virtual path is set. FIG. 11 shows a state wherein the virtual path VP1a is established for the ONU 71 by using the 0-system, and a virtual path VP2a is established for the ONU 72. In this state, the OLT 6 exchanges signals with the subscriber terminals 91 and 92 through the virtual paths VP1a and VP2a. At this time, the SELs 81 and 82 of the ONUs 71 and 72 respectively select the 0-system transmission/reception sections 31a and 32a.

In addition, virtual paths VP3a and VP4a are respectively established for the ONUs 73 and 74 by using the 1-system. In this state, the OLT 6 exchanges signals with the subscriber terminals 93 and 94 through the virtual paths VP3a and VP4a. At this time, the SELs 83 and 84 of the ONUs 73 and 74 respectively select 1-system transmission/receptions 33b and 34b.

On the other hand, standby-system virtual paths VP3b and VP4b corresponding to the virtual paths VP3a and VP4a are set by using the 0-system. In addition, standby-system virtual paths VP1b and VP2b corresponding to the virtual paths VP1a and VP2a are set by using 1-system.

In a normal case, communication is performed by using the virtual paths VP1a, VP2a, VP3a, and VP4a. If faults occur in the respective virtual paths VP1a, VP2a, VP3a, and VP4a, the control section 10 of the OLT 6 instructs the switch 4 to switch to the standby-system virtual paths VP1b, VP2b, VP3b, and VP4b and reconnect them to the corresponding ONUs.

The control section 10 sends switching request signals for the SELs 81 and 82 to the 1-system transmission/reception sections 31b and 32b of the ONUs 71 and 72 by using the standby-system virtual paths VP1b and VP2b, respectively. At the same time, the control section 10 sends switching request signals for the SELs 83 and 84 to the 0-system transmission/reception sections 33a and 34a of the ONUs 73 and 74 by using the standby-system virtual paths VP3b and VP4b, respectively.

The transmission/reception sections 31b, 32b, 33a, and 34a of the ONUs 71 to 74 receive the switching request signals from the OLT 6, and notify the control sections 111 to 114 of the signals. Upon reception of these notifications, the respective control sections 111 to 114 switch the SELs 81 to 84 to resume the communication with target subscriber terminals.

Assume that each of the 0-system transmission/reception section 1a and 1-system transmission/reception section 1b of the OLT 6 has a band of "100" (a band of "100" per system), and the bands are assigned as follows:

virtual path VP1a=40
virtual path VP2a=40
virtual path VP3a=40
virtual path VP4a=40
virtual path VP1b=10
virtual path VP2b=10
virtual path VP3b=10
virtual path VP4b=10

In this case, each of the subscriber terminals 91 to 94 can use only a band of "10" in the event of a fault, but can use a band of "40" in normal operation. That is, a band of "160 (=40×4)" can be used for services as a whole. Therefore, services can be provided beyond a band of "100" that is obtained by fully using one system in the conventional scheme, and protection against faults can be guaranteed.

Figure 12:
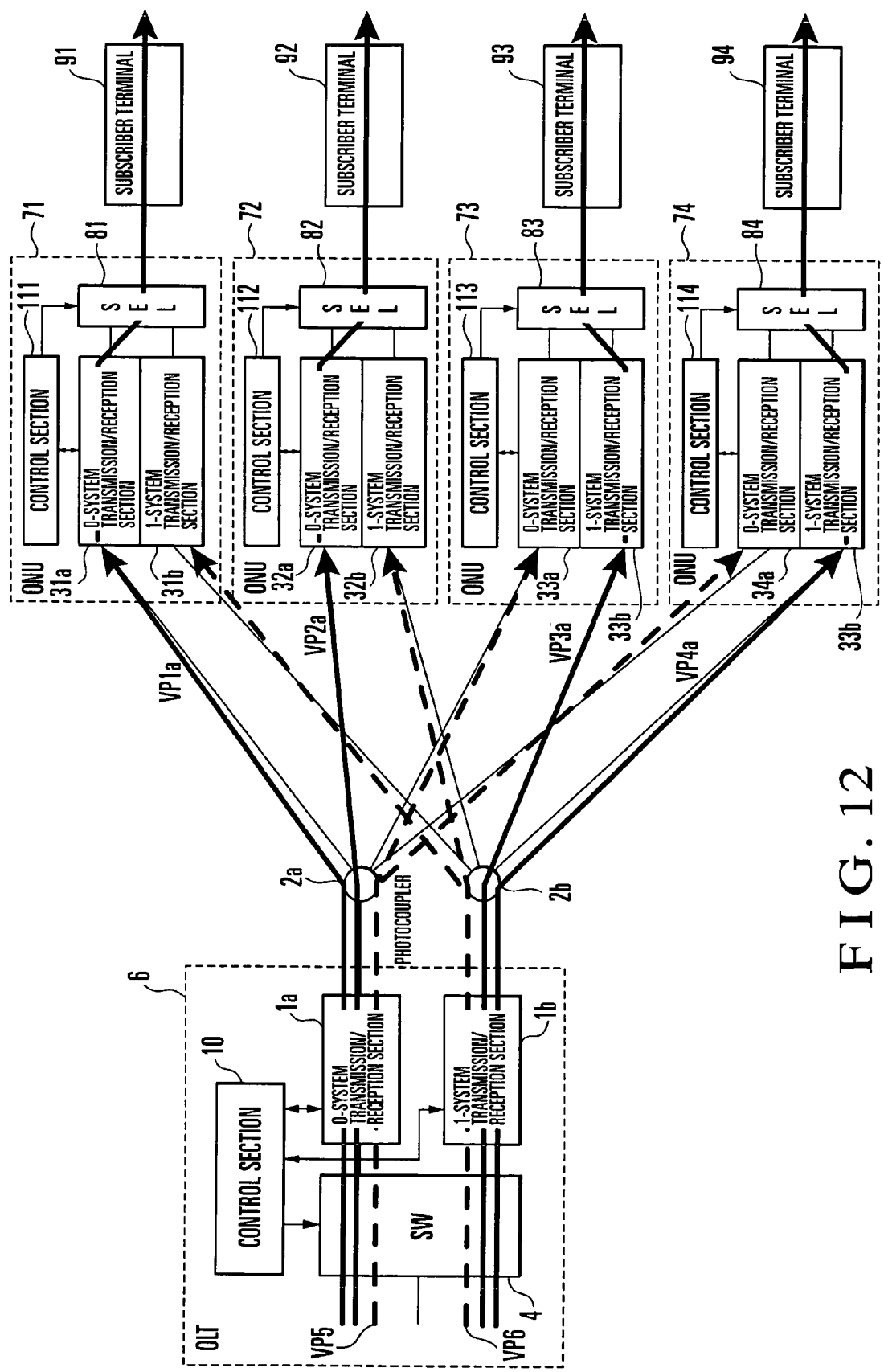
FIG. 12 is a block diagram showing the second virtual path setting example in the protection switching apparatus in FIG. 10.

The second virtual path setting example will be described next with reference to FIG. 12. As in the first virtual path setting example, the virtual paths VP1a to VP4a are respectively set for the subscriber terminals 91 to 94. In this state, a virtual path VP6 is set to switch the virtual path VP1a or VP2a that has become abnormal. In addition, a virtual path VP5 is set to switch the virtual path VP3a or VP4a that has become abnormal.

Assume that each of the 0-system transmission/reception section 1a and 1-system transmission/reception section 1b of the OLT 6 has a band of "100", and the respective bands are assigned as follows:

virtual path VP1a=33
virtual path VP2a=33
virtual path VP3a=33
virtual path VP4a=33
virtual path VP5=33
virtual path VP6=33

In this case, in normal operation, the total band that can be used for services is "132 (=33×4)". That is, services can be provided beyond a band of "100" that is obtained by fully using one system in the conventional scheme.

In this setting example, if one of the virtual paths VP1a and VP2a become abnormal, the virtual path can be restored by directly switching to the virtual path VP6. In addition, if both the virtual paths VP1a and VP2a become abnormal at once, the respective virtual paths are set again such that the subscriber terminals 91 to 94 share a band of "100" held by the 1-system transmission/reception section 1b of the OLT 6. With this operation, protection against faults can be guaranteed. The same applies to switching operation for the virtual paths VP3a and VP4a in the event of faults.

The third virtual path setting example will be described next with reference to FIG. 13. As in the first virtual path setting example, the virtual paths VP1a to VP4a are set for the subscriber terminals 91 to 94.

Assume that each of the 0-system transmission/reception section 1a and 1-system transmission/reception section 1b of the OLT 6 has a band of "100", and the respective bands are assigned as follows:

virtual path VP1a=50
virtual path VP2a=50
virtual path VP3a=50
virtual path VP4a=50

In this case, in normal operation, the total band that can be used for services is "200 (=50×4)". That is, services can be provided beyond a band of "100" that is obtained by fully using one system in the conventional scheme.

In this setting example, no band is set in advance to reset a virtual path when it becomes abnormal. Every time an abnormality occurs in a virtual path, the band that has been used by normal virtual paths is limited, and the surplus band is used to restore the abnormal virtual path. This makes it possible to guarantee protection against faults.

Figure 14:
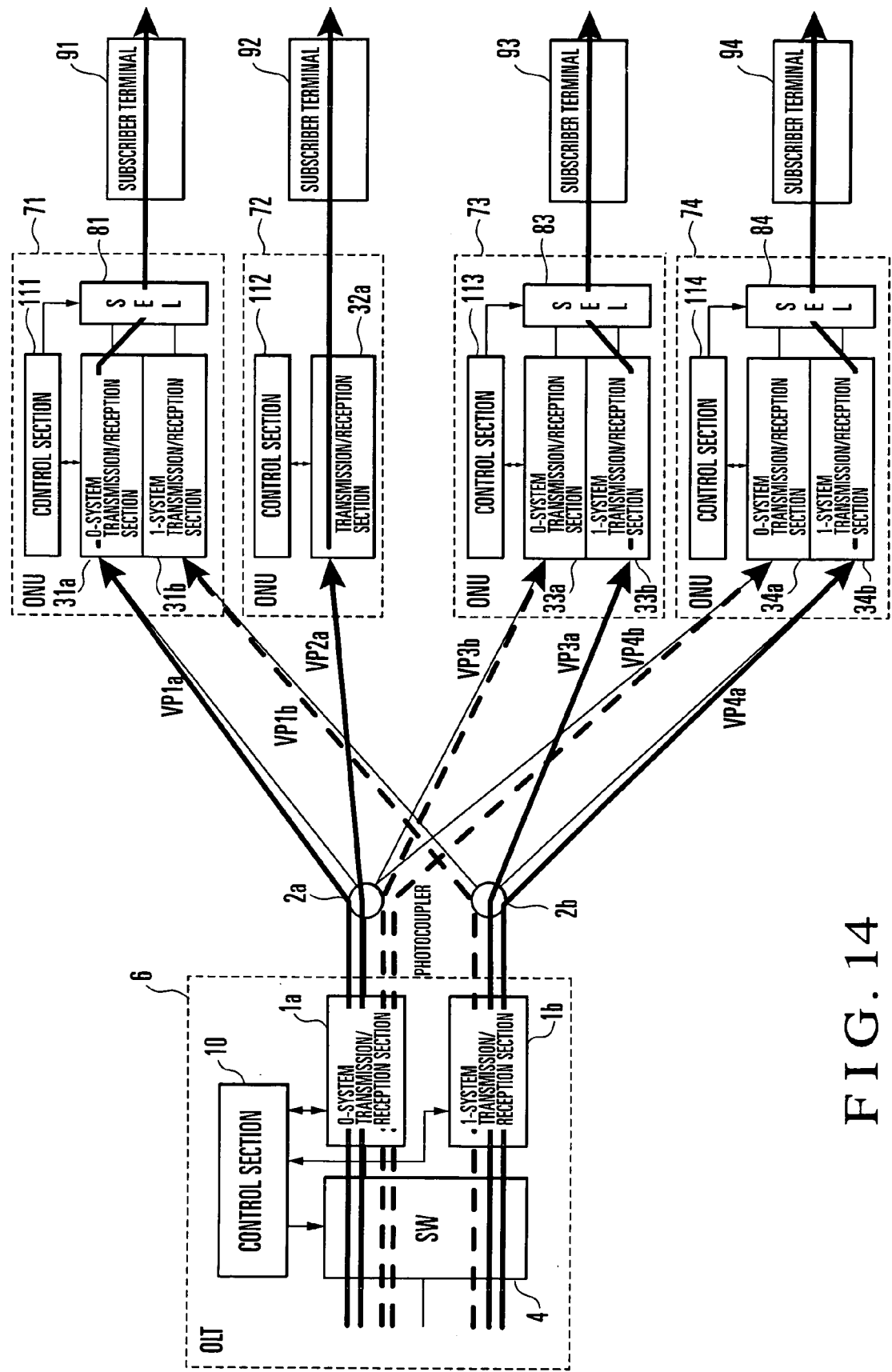
FIG. 14 is a block diagram showing the fourth virtual path setting example in the protection switching apparatus in FIG. 10.

The fourth virtual path setting example will be described next with reference to FIG. 14. As in the first virtual path setting example, the virtual paths VP1a to VP4a are set for the subscriber terminals 91 to 94. Assume that there is no need to provide protection for only services given to the subscriber terminal 92. Therefore, the ONU 72 requires only one transmission/reception section (1-system transmission/reception section 32a is used in FIG. 14).

In this setting example, communication is performed by using the virtual paths VP1a, VP2a, VP3a, and VP4a in normal operation. When faults occur in the virtual paths VP1a, VP3a, and VP4a, except for the virtual path VP2a, the control section 10 of the OLT 6 instructs the switch 4 to switch to the standby-system virtual paths VP1b, VP3b, and VP4b so as to resume the communication with the target subscriber terminals.

In this case as well, active- and standby-system virtual paths can be set in arbitrary bands within the range of the maximum band held by the physical resources.

As described above, in the second embodiment, virtual paths are switched by the switch 4 without discriminating physically different systems between an active system and a standby system. Since this makes it possible to establish a standby-system path to a target ONU through physically different transmission paths, network design can be performed with a high degree of freedom. As a consequence, active-system virtual paths can be provided by efficiently using limited physical resources, and standby-system virtual paths can be flexibly prepared in accordance with services.

Figure 15:
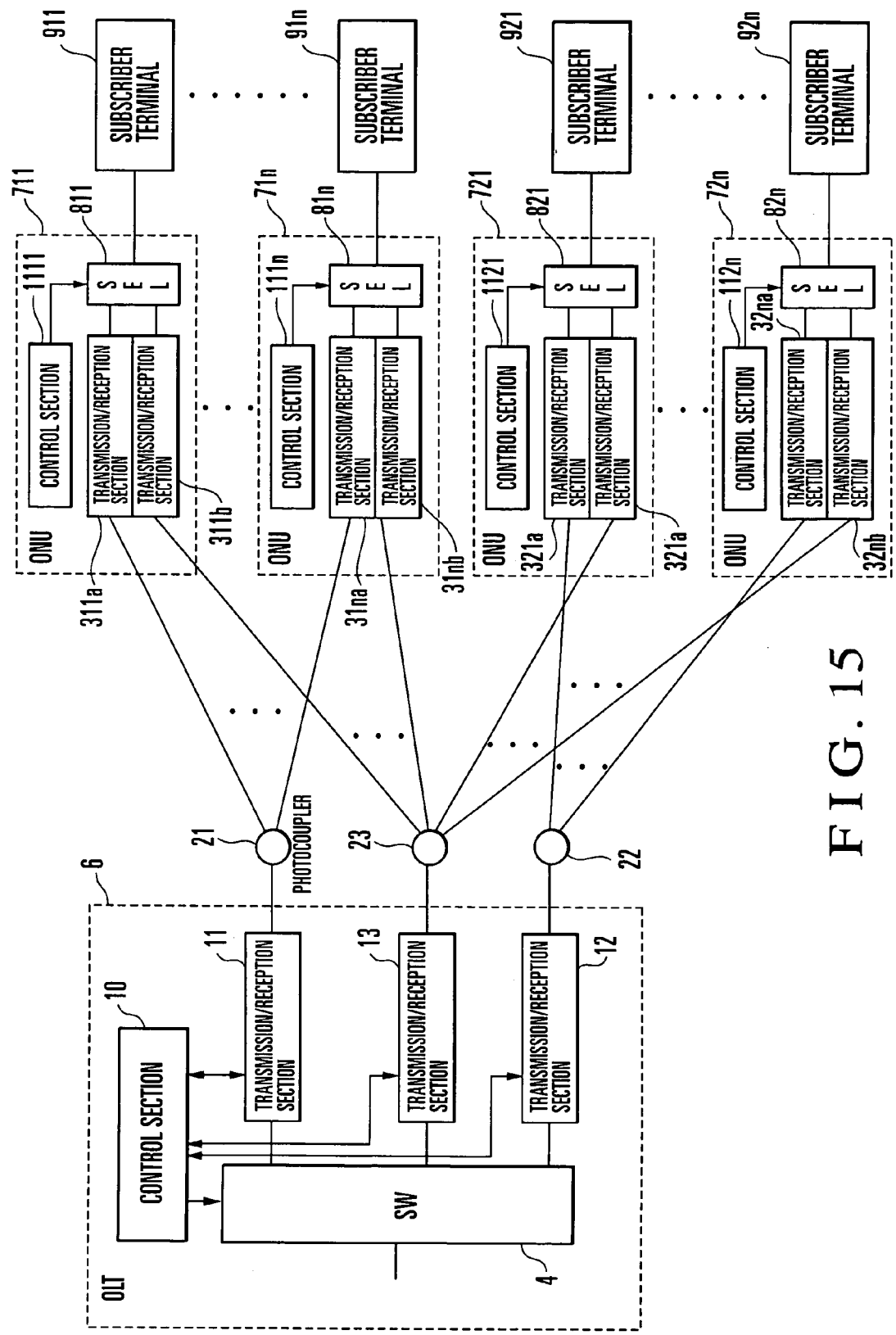
FIG. 15 is a block diagram showing a protection switching apparatus for a PON system according to the third embodiment of the present invention.

FIG. 15 shows a protection switching apparatus for a PON system according to the third embodiment of the present invention.

Referring to FIG. 15, in an OLT 6, transmission/reception sections 11 to 13 are connected to different ports of a switch 4. The transmission/reception section 11 of the OLT 6 is connected to transmission/reception sections 311a to 31na of ONUs 711 to 71n through a photocoupler 21. The transmission/reception section 12 of the OLT 6 is connected to transmission/reception sections 321a to 32na of ONUs 721 to 72n through a photocoupler 22. The transmission/reception section 13 is connected to transmission/receptions 311b to 31nb of ONUs 711 to 71n and transmission/reception sections 321b to 32nb of the ONUs 721 to 72n through a photocoupler 23.

In normal operation, virtual paths are set for subscriber terminals 911 to 91n through the transmission/reception section 11 of the OLT 6. In addition, virtual paths are set for subscriber terminals 921 to 92n through the transmission/reception section 12 of the OLT 6. It is taken for granted that these virtual paths rarely become abnormal at once. For this reason, every time an abnormality occurs in an active-system virtual path, a standby-system virtual path is set again by using the band held by the transmission/reception section 13. That is, the transmission/reception sections 11 and 12 serve as 0-system transmission/reception sections, whereas the transmission/reception section 13 serves as a 1-system transmission/reception section.

With this arrangement, the single transmission/reception section 13 can provide protection for the ONUs 711 to 771n and 721 to 72n connected to the transmission/reception sections 11 and 12 in the OLT 6. Note that the number of transmission/reception sections in the OLT 6 may be four or more, and the number of ONU groups may be three or more.

Figure 16:
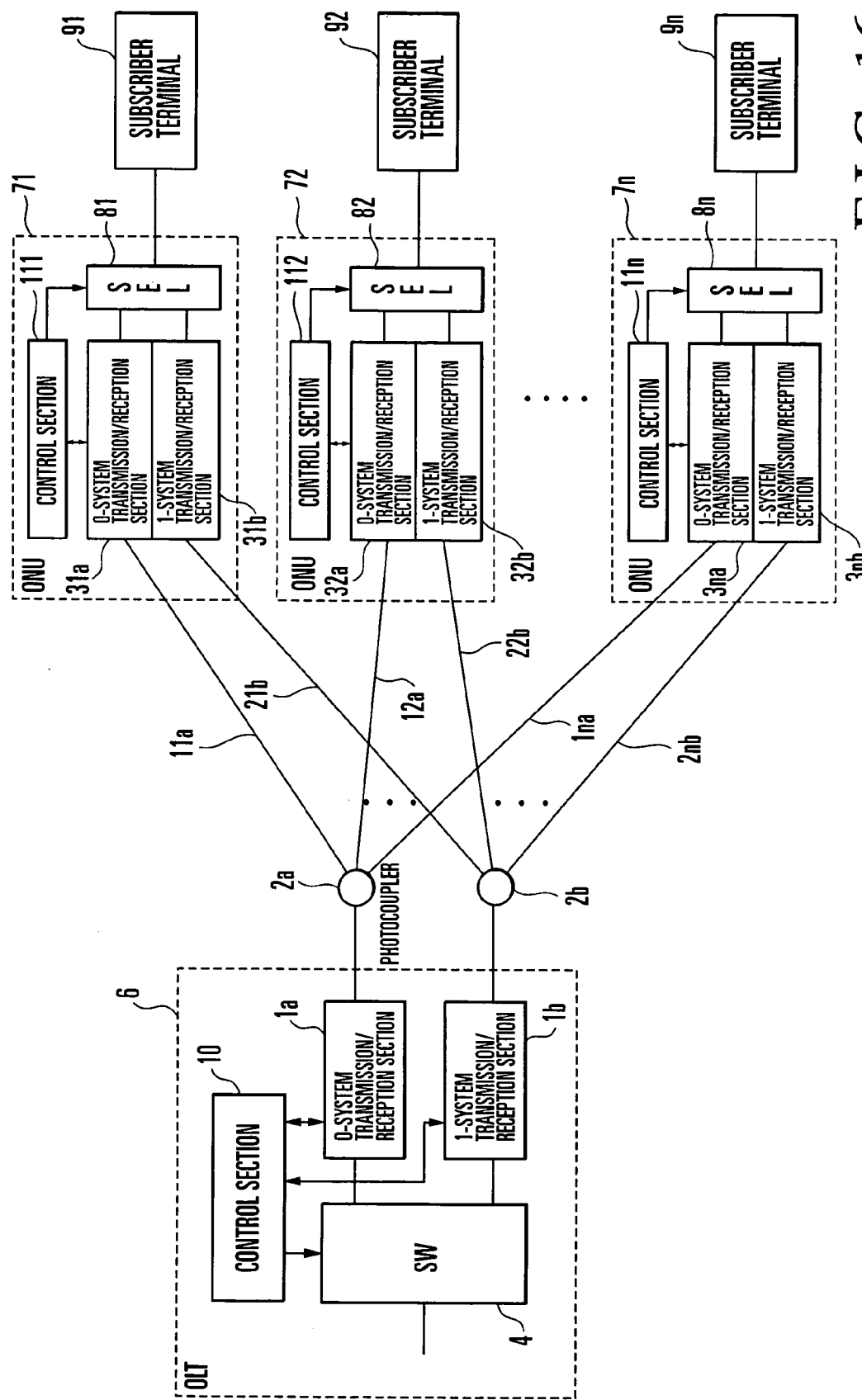
FIG. 16 is a block diagram showing a protection switching apparatus for a PON system according to the fourth embodiment of the present invention.

FIG. 16 shows a protection switching apparatus for a PON system according to the fourth embodiment of the present invention.

The fourth embodiment is a modification to the first embodiment. More specifically, control sections 111 to 11n are additionally arranged in the ONUs 71 to 7n in FIG. 1, and the control sections 111 to 11n perform selective control on SELs 81 to 8n to switch 0-system transmission/receptions 31a to 3na and 1-system transmission/receptions 31b to 3nb of the ONUs 71 to 7n. The arrangement of the remaining portion is the same as that in FIG. 1. The same reference numerals as in FIG. 1 denote the same parts in FIG. 16, and a description thereof will be omitted.

The operation of the protection switching apparatus having the above arrangement will be described below.

Figure 17:
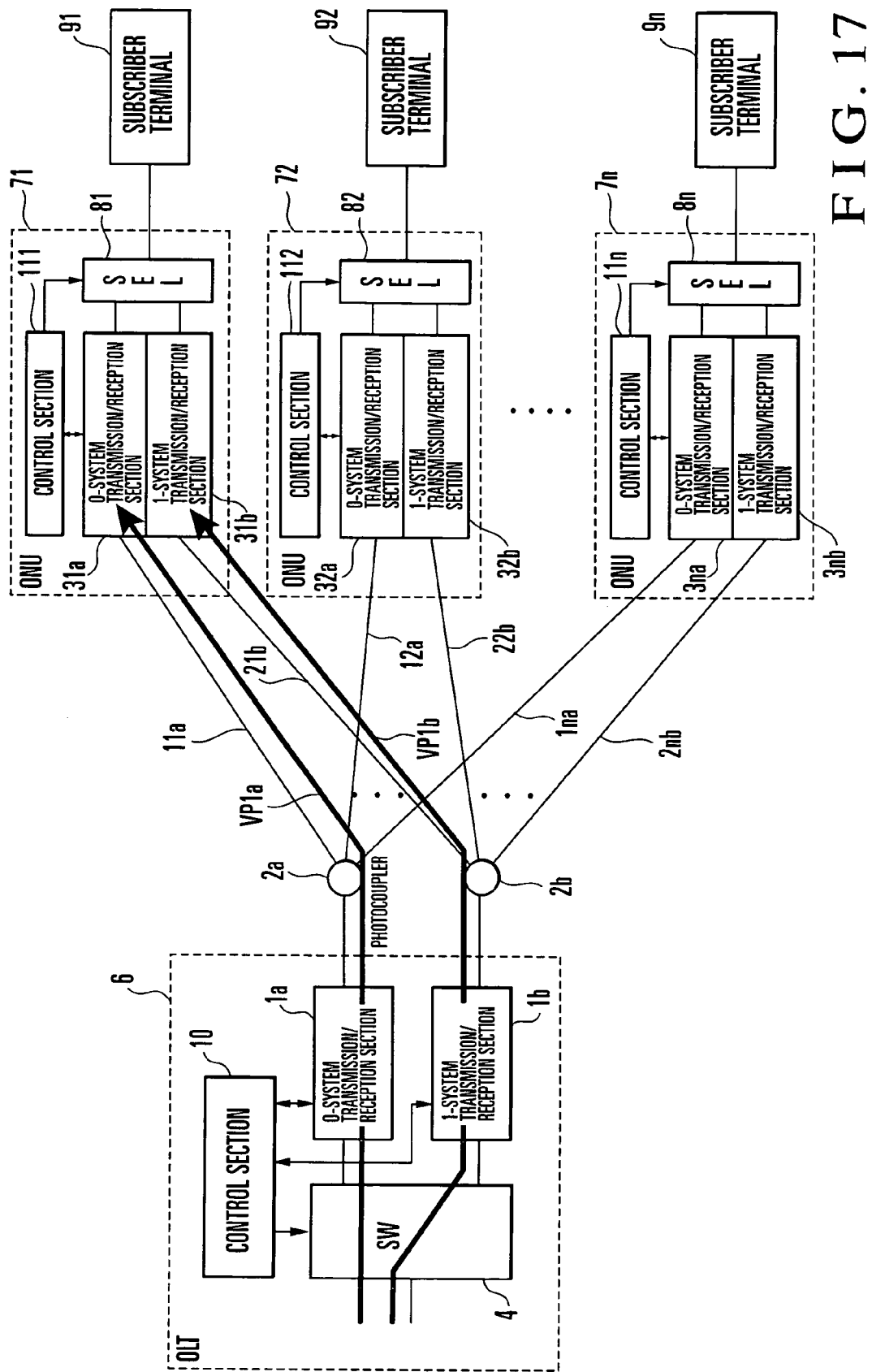
FIG. 17 is a block diagram showing virtual paths established between an OLT and subscriber terminals in the protection switching apparatus in FIG. 16.

Referring to FIG. 17, when a 0-system transmission/reception section 1a of a OLT 6 is connected to the 0-system transmission/reception section 31a of the ONU 71 through a photocoupler 2a and optical fiber 11a, a virtual path VP1a is established between a subscriber terminal 91 and the 0-system transmission/reception section 1a of the OLT 6 in accordance with the setting of a switch 4. When a 1-system transmission/reception section 1b of the OLT 6 is connected to the 1-system transmission/reception section 31b of the ONU 71 through a photocoupler 2b and optical fiber 21b, a virtual path VP1b is established between the subscriber terminal 91 and the 1-system transmission/reception section 1b of the OLT 6 in accordance with the setting of the switch 4.

In the case shown in FIG. 17, the subscriber terminal 91 can communicate with both the 0-system transmission/reception section 1a and 1-system transmission/reception section 1b of the OLT 6.

Switching operation from an active-system virtual path under normal communication operation to a standby-system virtual path will be described next with reference to FIG. 18.

Figure 18:
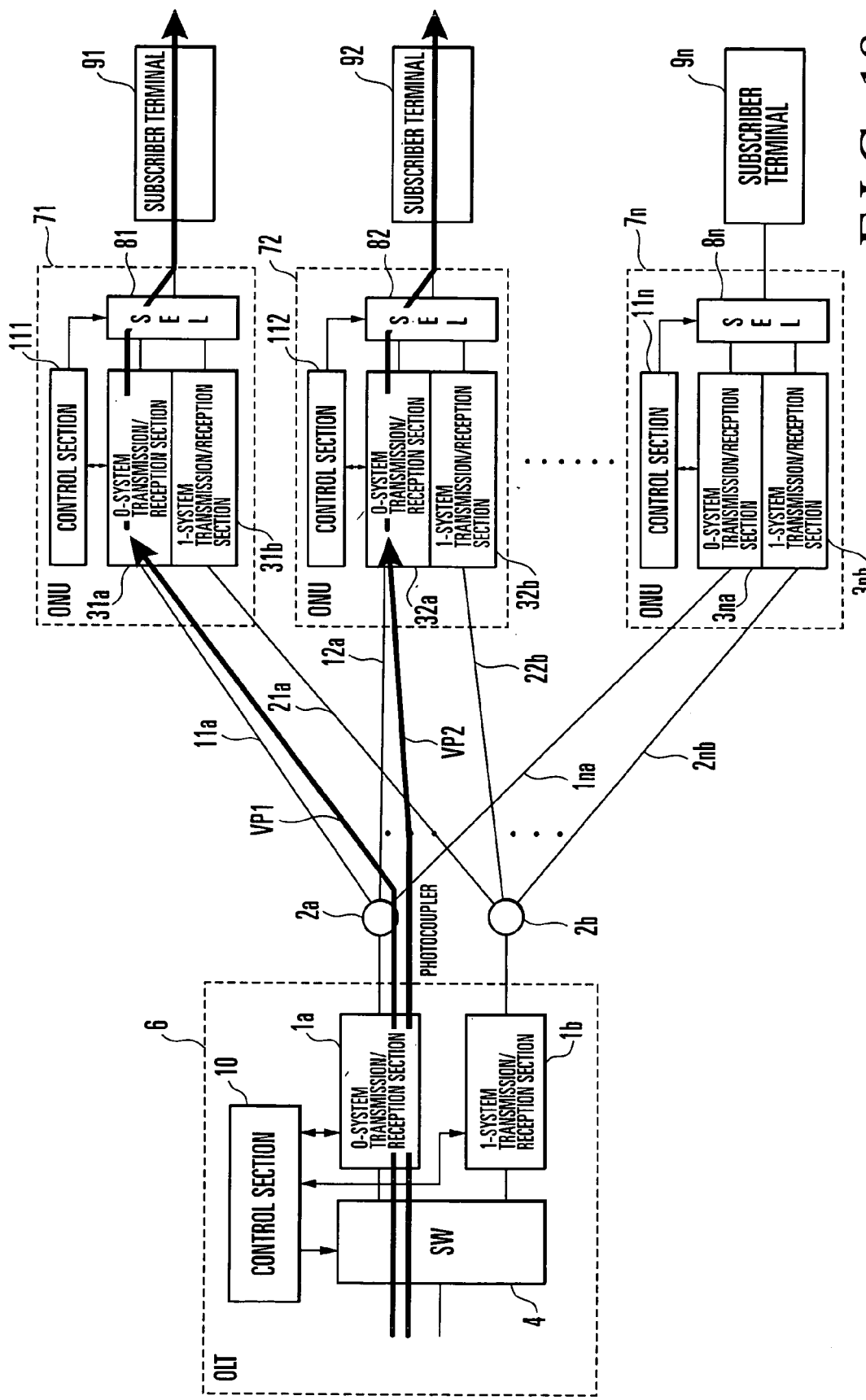
FIG. 18 is a block diagram showing a normal established state of virtual paths between the OLT and a plurality of subscriber terminals in the protection switching apparatus in FIG. 16.

Referring to FIG. 18, the bold lines indicate established virtual paths VP1 and VP2. The virtual path VP1 is established through the following route: switch 4—0-system transmission/reception section 1a of the OLT 6—photocoupler 2a—optical fiber 11a—0-system transmission/reception section 31a of the ONU 71—SEL 81—subscriber terminal 91. Communication is performed between the 0-system transmission/reception section 1a and the subscriber terminal 91 through the virtual path VP1. The virtual path VP2 is established through the following route: switch 4—0-system transmission/reception section 1a of the OLT 6—photocoupler 2a—optical fiber 12a—0-system transmission/reception section 32a in an ONU 72—SEL 82—subscriber terminal 92. Communication is performed between the 0-system transmission/reception section 1a and the subscriber terminal 92 through the virtual path VP2.

In the case shown in FIG. 18, therefore, the virtual path VP1 takes charge of communication between the OLT 6 and the subscriber terminal 91, and the virtual path VP2 takes charge of communication between the OLT 6 and subscriber terminal 92.

Figure 19:
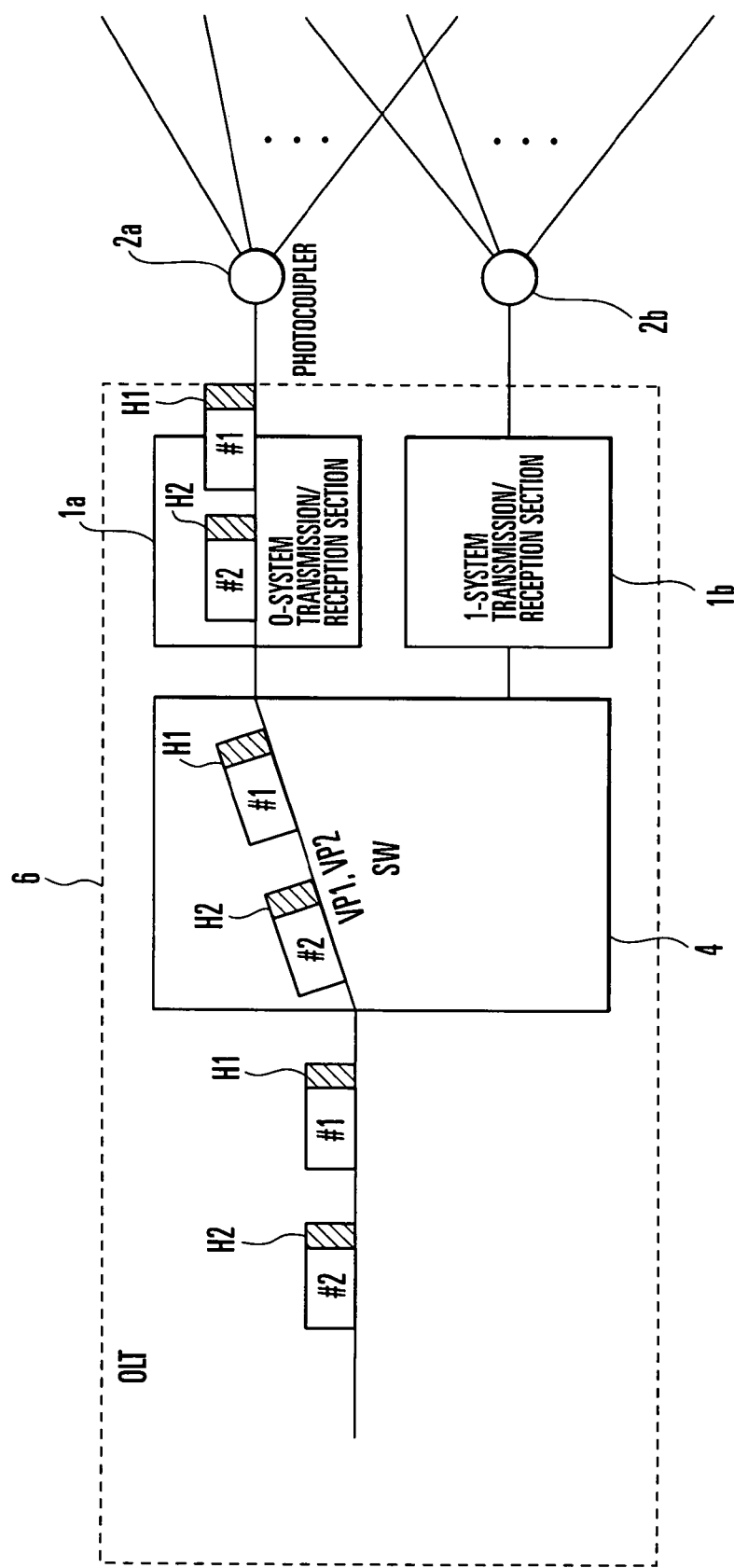
FIG. 19 is a block diagram showing the flows of ATM signals in the normal established state in FIG. 16.

In a normal communication state shown in FIG. 18, the switch 4 operates in the manner shown in FIG. 19. Like FIG. 4, FIG. 19 shows the flows of signals. More specifically, ATM cell #1 to be transmitted to the ONU 71 is transmitted to the 0-system transmission/reception section 31a of the ONU 71 through the switch 4, 0-system transmission/reception section 1a, photocoupler 2a, and virtual path VP1. ATM cell #2 to be transmitted to the ONU 72 is transmitted to the 0-system transmission/reception section 32a of the ONU 72 through the switch 4, 0-system transmission/reception section 1a, photocoupler 2a, and virtual path VP2.

In this case, both the ATM cells #1 and #2 pass through the 0-system transmission/reception section 1a. In addition, the switch 4 has the function of outputting ATM cells #1 and #2 to corresponding ports of the switch 4 in accordance with the values of headers H1 and H2 of ATM cells #1 and #2.

Figure 20:
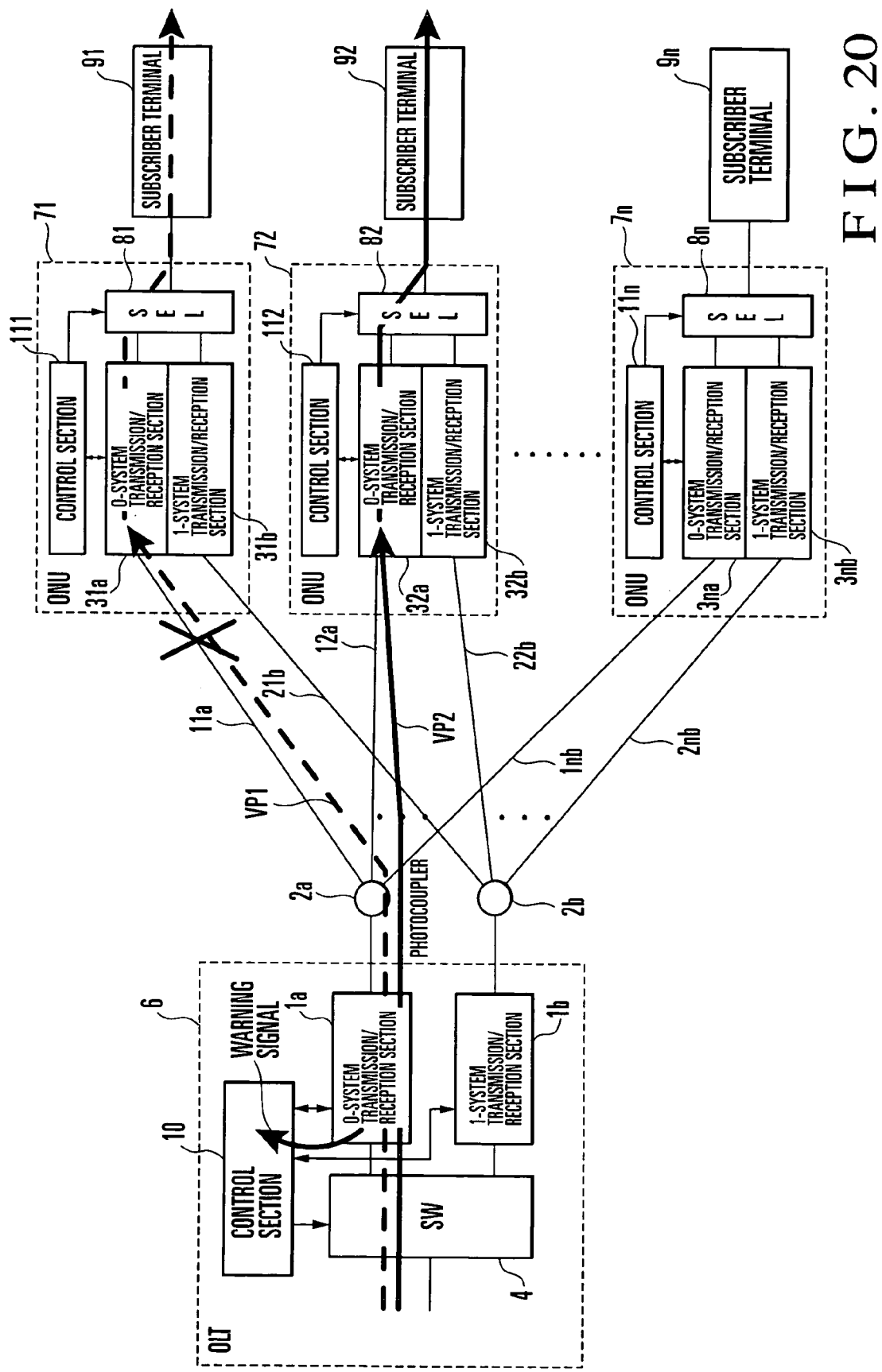
FIG. 20 is a block diagram showing a state wherein an abnormality has occurred in a virtual path (VP1) in the normal established state in FIG. 16.

Assume that in the normal communication state shown in FIG. 18, an abnormality (e.g., disconnection) occurs in the virtual path VP1 between the photocoupler 2a and the 0-system transmission/reception section 31a of the ONU 71, as indicated by "X" in FIG. 20. In this case, only a signal from the ONU 71 does not arrive at the 0-system transmission/reception section 1a in the OLT 6. The 0-system transmission/reception section 1a of the OLT 6 detects the abnormality in the communication state of the virtual path VP1, and sends a warning signal to the control section 10 of the OLT 6.

Figure 21:
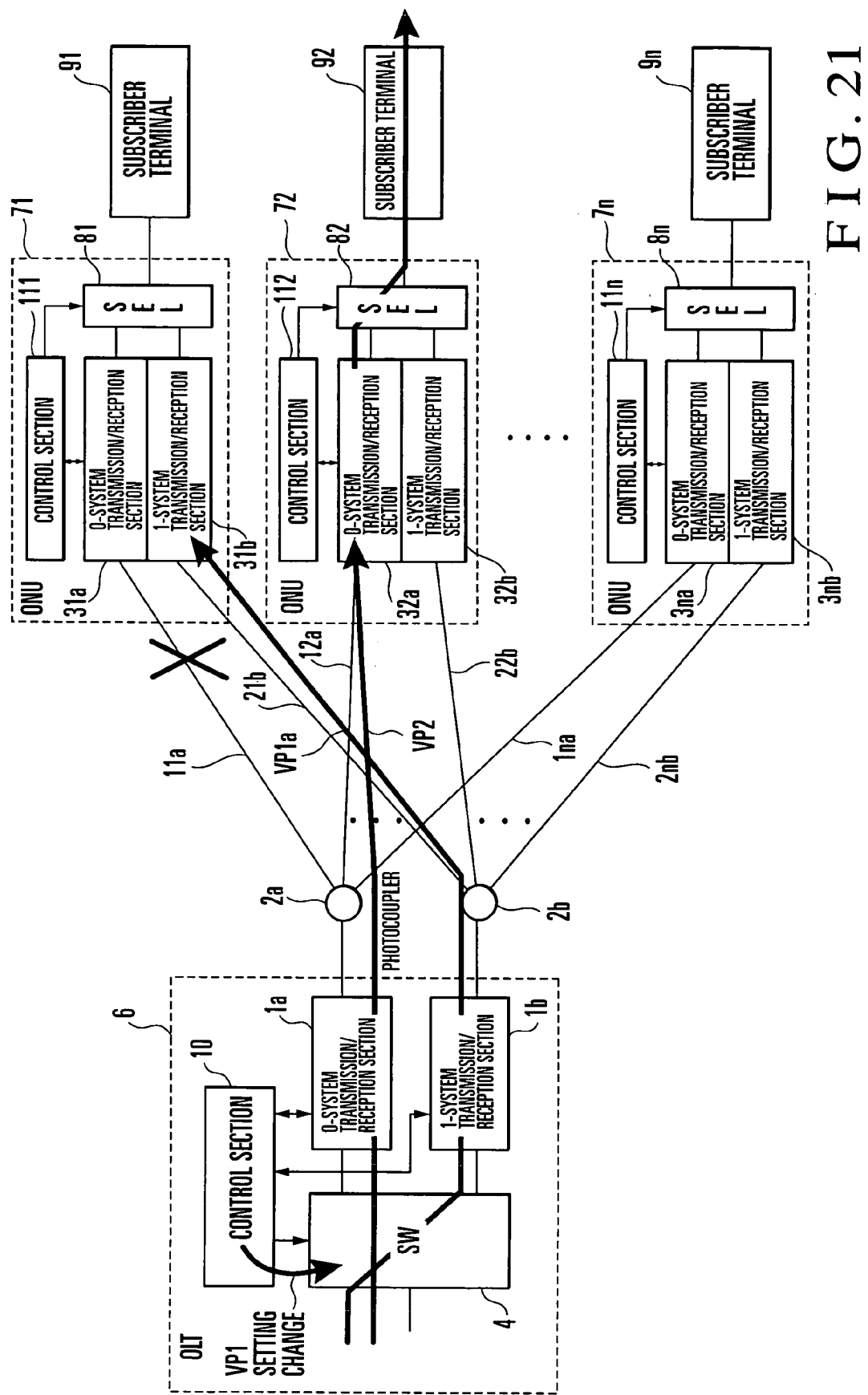
FIG. 21 is a block diagram showing a state wherein a new virtual path (VP2a) is established from the abnormal state in FIG. 20.

Upon reception of the warning signal from the 0-system transmission/reception section 1a, the control section 10 controls the switch 4 to change the setting of virtual paths. As a consequence, the switch 4 switches the virtual path VP1 to the virtual path VP1a, as shown in FIG. 21. That is, the virtual path VP1a is established through the following route: 1-system transmission/reception section 1b of the OLT 6 photocoupler 2b—optical fiber 21b–1-system transmission/reception section 31b of the ONU 71. As a consequence, the communication between the OLT 6 and the ONU 71 can be resumed.

At this time, the virtual path VP2 used for communication between the OLT 6 and the ONU 72 is kept used for the communication without being affected.

Figure 22:
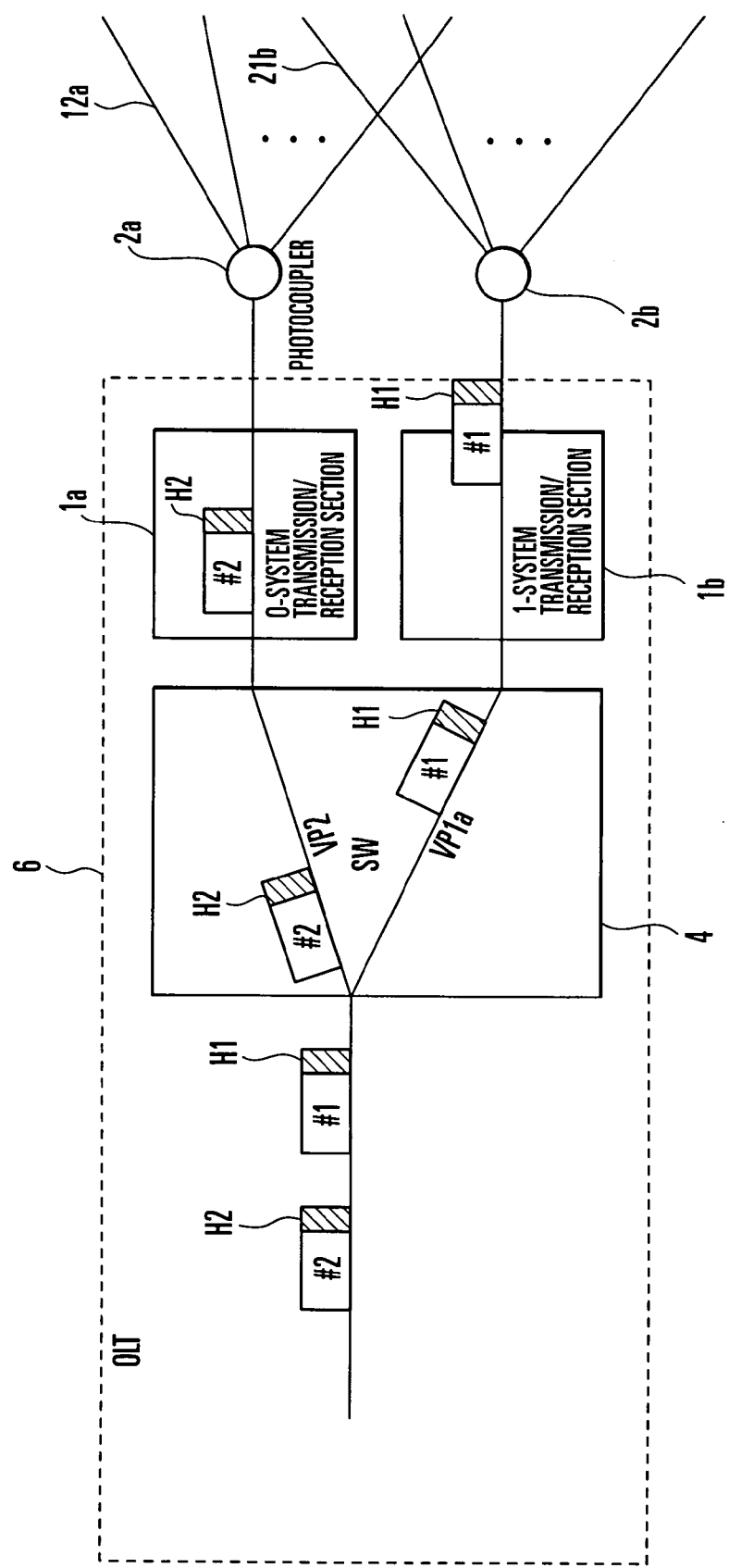
FIG. 22 is a block diagram showing the flows of ATM signals in the state wherein the new virtual path (VP2a) is established in FIG. 21.

FIG. 22 shows the flows of signals through the switch 4 at the time of switching from the virtual path VP1 to the virtual path VP1a.

Referring to FIG. 22, in accordance with the setting of a virtual path for the switch 4, ATM cell #1 to be transmitted to the ONU 71 is transmitted to the virtual path VP1a formed by the following route: switch 4—1-system transmission/reception section 1b in the OLT 6—photocoupler 2b—optical fiber 21b. ATM cell #2 to be transmitted to the ONU 72 is transmitted to the virtual path VP2 formed by the following route: switch 4—0-system transmission/reception section 1a of OLT 6—photocoupler 2a—optical fiber 12a—0-system transmission/reception section 32a of the OLT 6.

In accordance with the values of the headers H1 and H2 added to the cells, these ATM cells #1 and #2 are distributed to the corresponding ports of the switch 4.

The operation of the SEL 81 of the ONU 71 upon the above switching from the virtual path VP 1 to the virtual path VP1a will be described next with reference to FIG. 23.

Figure 23:
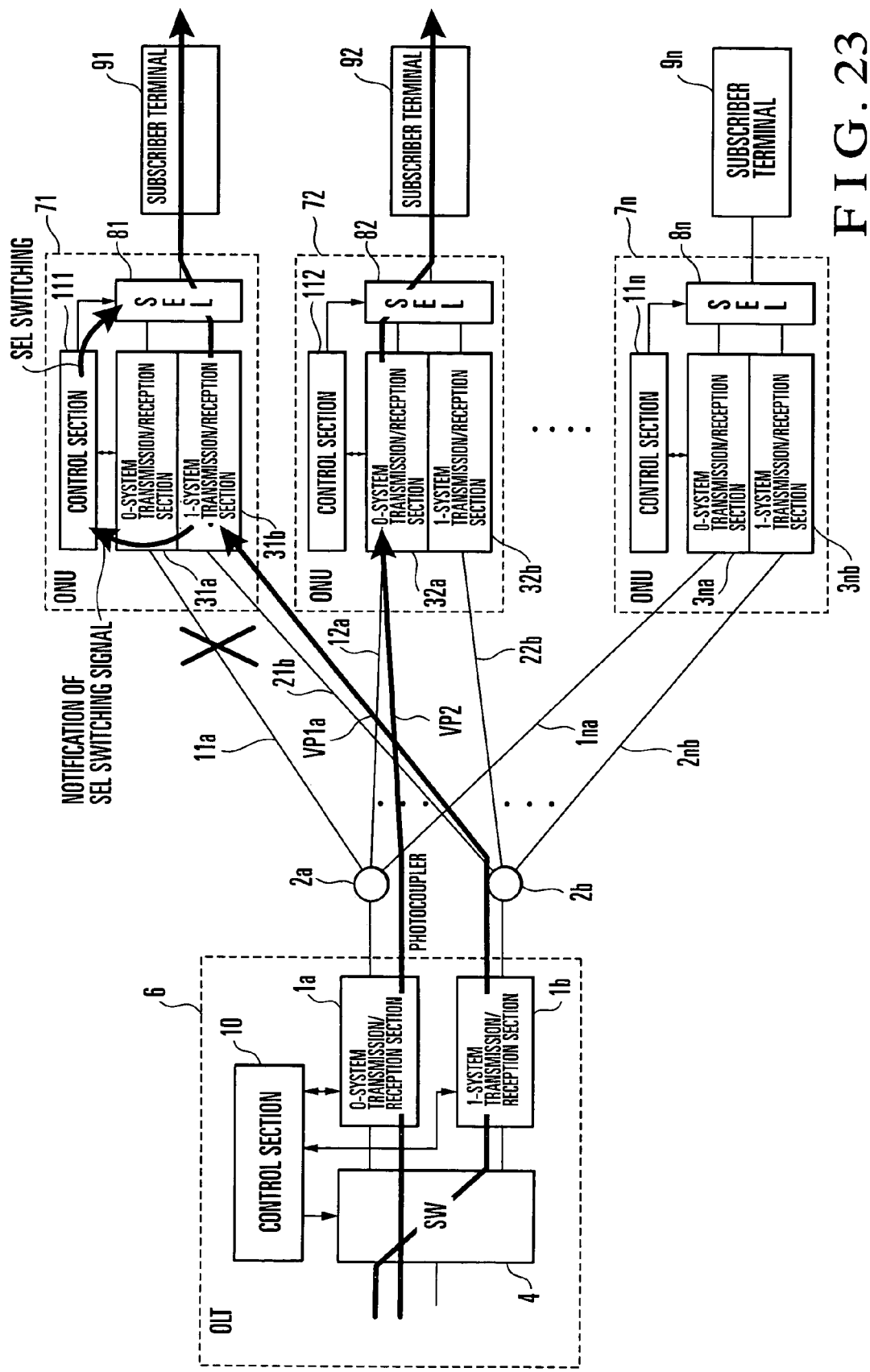
FIG. 23 is a block diagram showing the operation of a selector of each ONU at the time of switching to the new virtual path (VP2a) in FIG. 21.
Figure 24:
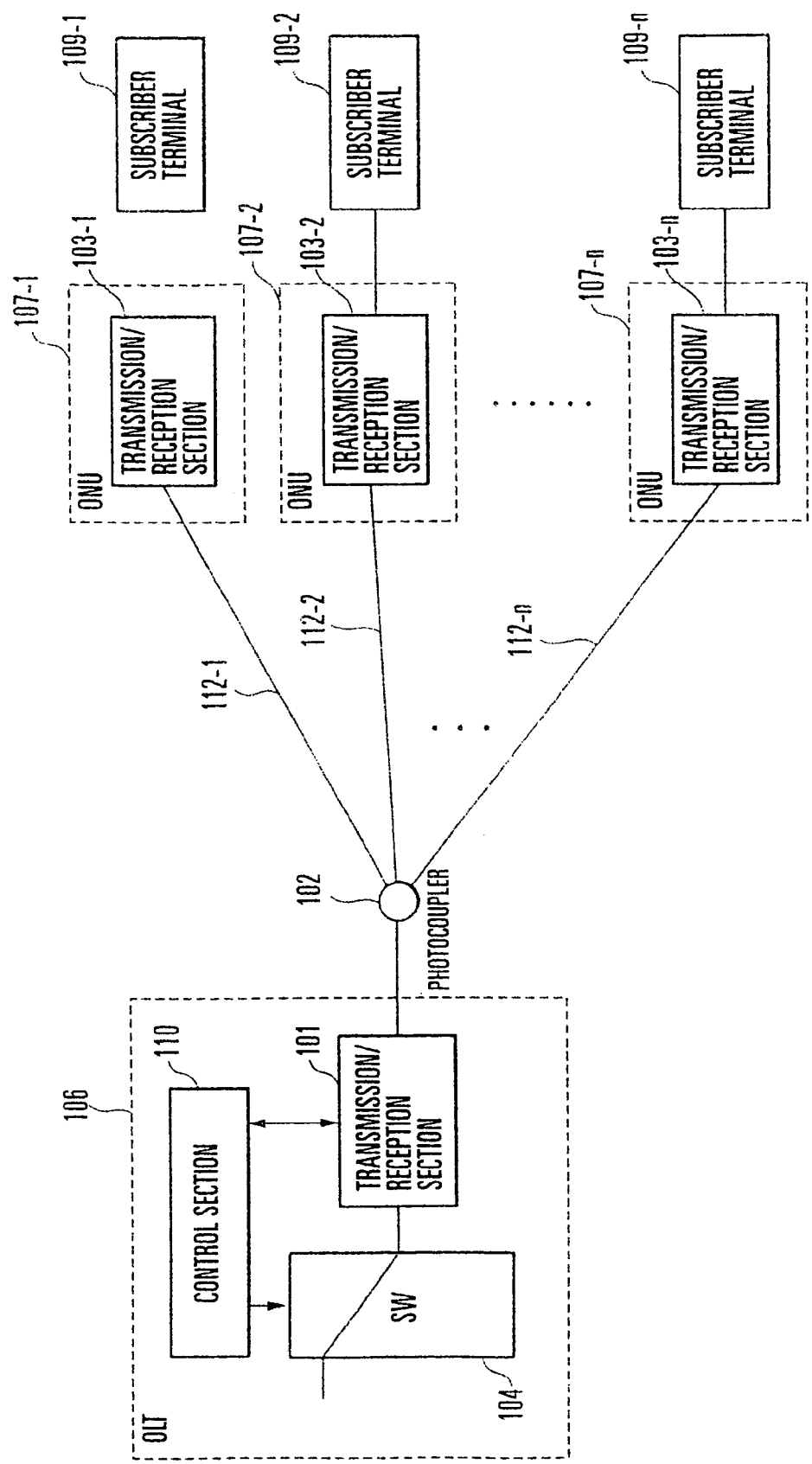
FIG. 24 is a block diagram showing the basic arrangement of a PON system.
Figure 25:
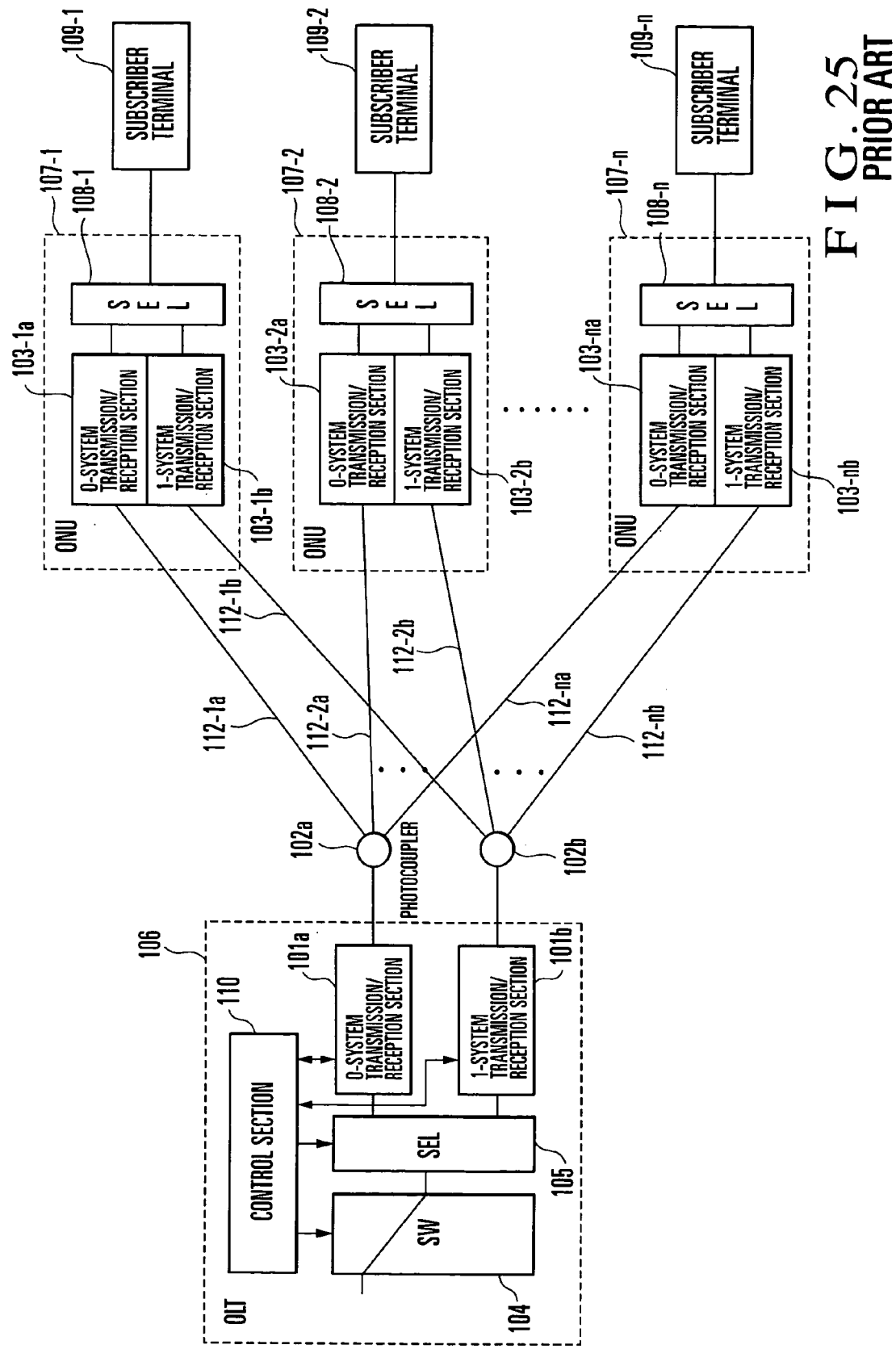
FIG. 25 is a block diagram showing the first example of a conventional PON system having a dual arrangement.
Figure 26:
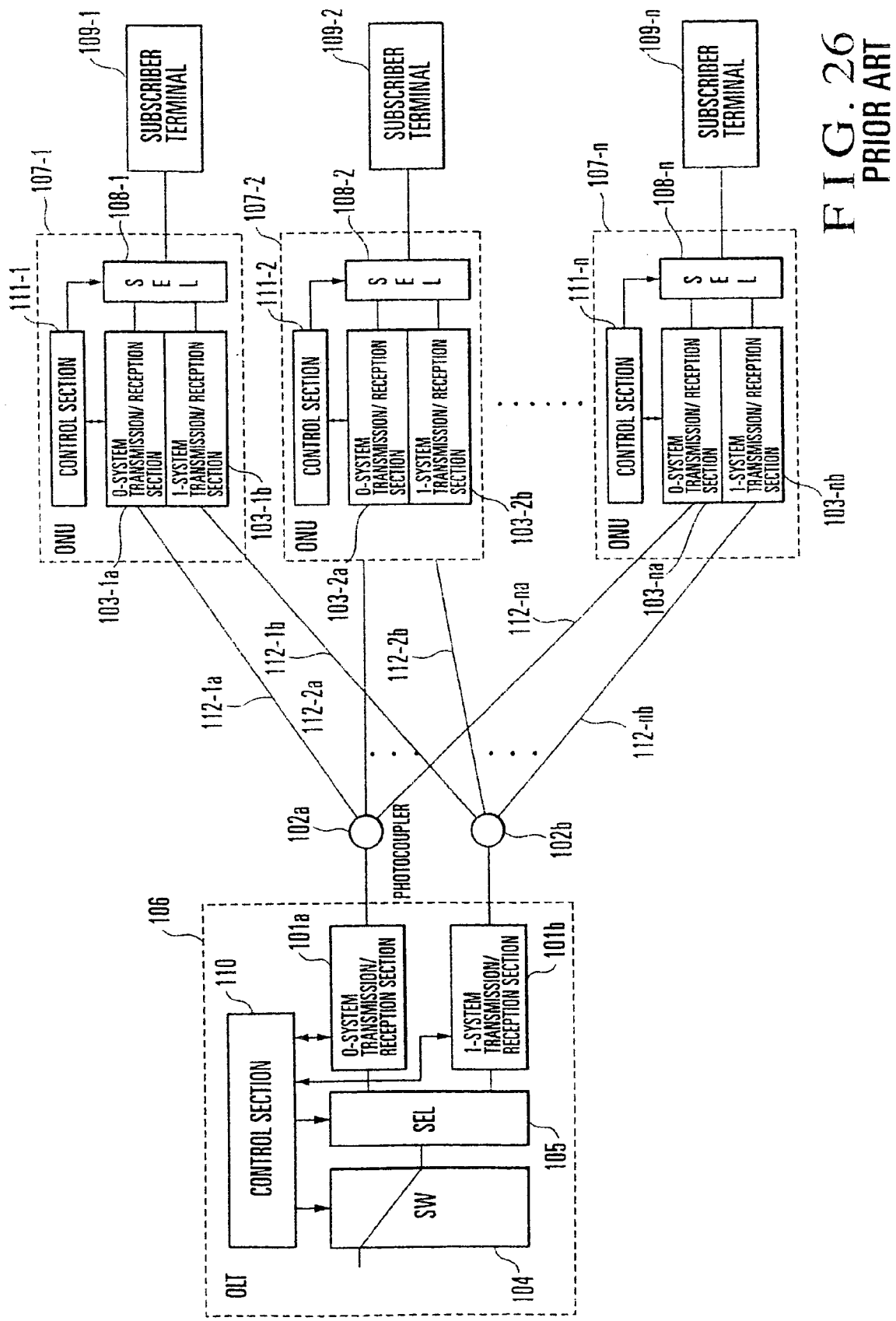
FIG. 26 is a block diagram showing the second example of a conventional PON system having a dual arrangement.

Referring to FIG. 23, the control section 10 of the OLT 6 controls the switch 4, and transmits a switching request signal to the ONU 71 through the virtual path VP1a established in the above manner. Upon reception of the switching request signal from the OLT 6, the 1-system transmission/reception section 31b of the ONU 71 notifies the control section 111 of the SEL switching signal.

Upon reception of the SEL switching signal, the control section 111 outputs a switching control signal to the SEL 81 of the ONU 71. In accordance with the switching control signal from the ONU 71, the SEL 81 switches the 0-system transmission/reception section 31a of the ONU 71 to the 1-system transmission/reception section 31b, and connects the subscriber terminal 91 to the 1-system transmission/reception section 31b through the SEL 81. With this operation, a signal from the 1-system transmission/reception section 31b of the ONU 71 is transmitted to the subscriber terminal 91 through the SEL 81. As a consequence, the communication between the OLT 6 and the subscriber terminal 91 can be resumed through the virtual path VP1a.

According to the fourth embodiment, since the control sections 111 to 11n of the ONUs 71 to 7n perform switching control on the 0-system transmission/reception section and 1-system transmission/reception section more reliably, communication between each subscriber terminal and the OLT can be reliably established, and a network can be flexibly designed.

In each embodiment described above, optical transmission paths constituted by the photocouplers 2a and 2b and optical fibers 11a to 1na and 21b to 2nb are used as transmission paths. However, the present invention is not limited to this, and may be applied to a case wherein a coaxial cable or another kind of metal line is used as a transmission path.

In each embodiment described above, an abnormality due to disconnection of the virtual path VP1 is assumed to be an example of an abnormal communication state. However, in addition to this abnormal state, the present invention can be applied to abnormal states wherein, for example, one or a plurality of the 0-system transmission/receptions 31a to 3na and 1-system transmission/receptions 31b to 3nb of the ONUs 71 to 7n has failed, the photocouplers 2a and 2b have failed, and SELs 81 to 8n have failed.

In each embodiment described above, when the virtual path VP1 is to be switched to the virtual path VP1a by using the ATM system, this switching operation is performed by distributing ATM cells #1 and #2 to ports of the switch 4 in accordance with the values of the headers H1 and H2 of the ATM cells #1 and #2. However, the present invention is not limited to this and can be applied to an STM (Synchronous Transfer Mode) PON system. In this case, a virtual path may be established by determining specific ports of the switch 4 for which data are to be destined in accordance with the time slots of frames output from the control section 10 in a predetermined cycle.

Each embodiment described above has been described in association with the occurrence of an abnormality in the virtual path VP1. Even if, however, an abnormality occurs in another portion, e.g., in the optical fiber 22b before the establishment of a virtual path, a virtual path can be established by switching the switch 4 to allow communication between the OLT 6 and the subscriber terminal 92.

In this case, when the 1-system transmission/reception section 1b in the OLT 6 detects the abnormality in the optical fiber 22b while the virtual path VP2 shown in FIG. 21 is not established, and outputs a warning signal, the control section 10 controls the switch 4 to switch ports. With this operation, the virtual path VP2 is established by the following route: switch 4—0-system transmission/reception section 1a of the OLT 6—photocoupler 2a—optical fiber 12a—0-system transmission/reception section 32a of the ONU 72. At the same time, the 0-system transmission/reception section 32a of the ONU 72 is selected by the SEL 82 and connected to the subscriber terminal 92. This allows communication between the subscriber terminal 92 and the OLT 6.

In each embodiment described above, virtual paths are switched in the event of an abnormality in one optical fiber, i.e., a transmission path of one system. However, the virtual paths between the OLT 6 and the ONUs 71 to 7n can be simultaneously switched by the switch 4.

In this case, when the 0-system transmission/receptions 31a to 3na of the ONUs 71 to 7n simultaneously transmit warning signals indicating communication abnormalities, the control section 10 of the OLT 6, which has received these warning signals, simultaneously switches the ports of the switch 4 to simultaneously switch the virtual paths from the active system between the OLT 6 and the ONUs 71 to 7n to the standby system. In addition, when the ONUs 71 to 7n, which have accessed signals distributed from the OLT 6, simultaneously output warning signals, the control section 10 may simultaneously switch predetermined ports of the switch 4 upon reception of the signals.

As has been described above, in the protection switching method and apparatus for the PON system according to the present invention, only a path to be restored can be easily switched to a standby-system path without affecting communication through a normal virtual path in the PON system, and the communication can be continued. This makes it possible to easily switch virtual paths without causing any short break and the like in normal apparatuses.

What is claimed is:

1. A protection switching method for a passive optical network (PON) system including
an optical line terminal for switching between a first active-system transmission/reception section and a first standby-system transmission/reception section by using a switch,
a plurality of network units for selectively connecting second active-system transmission/reception sections and second standby-system transmission/reception sections to subscriber terminals upon switching said sections through selectors in the event of a communication abnormality, and
transmission paths for star-connecting said second active-system transmission/reception sections to said first active-system transmission/reception section, and also star-connecting said second standby-system transmission/reception sections to said first standby-system transmission/reception section, characterized by comprising the steps of:
setting an active-system virtual path and a standby-system virtual path between said optical line terminal and said subscriber terminal in different time slot bands;
outputting by said switch a data cell to one of a plurality of ports in the network units, to which said first active-system transmission/reception section and said first standby-system transmission/reception section are connected, in accordance with one of a header value added to the data cell or a time slot of a frame;
detecting a communication abnormality in at least one active-system virtual path established between said optical line terminal and said subscriber terminal through said transmission path and said network unit; and
upon detection of a communication abnormality in the active-system virtual path, switching by said switch to switch only the transmission paths to establish a standby-system virtual path between said optical line terminal and said subscriber terminal serving as a communication partner, without affecting communication through other active virtual paths in the PON system.

2. A method according to claim 1, wherein the method further comprises
the step of simultaneously transmitting warning signals indicating communication abnormalities from said network units, and
the step of switching comprises the step of simultaneously switching a plurality of active-system virtual paths between said optical line terminal and said subscriber terminals to a plurality of standby-system virtual paths by simultaneously switching/controlling all ports of said switch in said optical line terminal upon reception of the warning signals.

3. A method according to claim 1, wherein the method further comprises
the step of simultaneously transmitting warning signals indicating communication abnormalities from said network units which have accessed signals distributed from said optical line terminal, and
the step of switching comprises the step of simultaneously switching a plurality of active-system virtual paths between said optical line terminal and said subscriber terminals to a plurality of standby-system virtual paths by simultaneously switching/controlling predetermined ports of said switch in said optical line terminal upon reception of the warning signals.

4. A method according to claim 1, further comprising the steps of:
transmitting a selector switching signal from said optical line terminal to said network unit when a communication abnormality in the active-system virtual path is detected; and
selectively switching said active-system transmission/reception section and said standby-system transmission/reception section in said network unit when the selector switching signal is received.

5. A method according to claim 1, wherein the step of setting, in different bands, a plurality of first active-system virtual paths running through said first and second active-system transmission/reception sections, establishes a plurality of second active-system virtual paths running through said first and second standby-system transmission/reception sections, first standby-system virtual paths running through said first and second active-system transmission/reception sections, and second standby-system virtual paths running through said first and second standby-system transmission/reception sections, and
the step of switching comprises the step of switching the virtual path to one of the first and second standby-system virtual paths through said switch when a communication abnormality is detected in one of the first and second active-system virtual paths.

6. A method according to claim 5, further comprising the step of resetting the second active-system virtual path and the second standby-system virtual path to share a band assigned to said first active-system transmission/reception section when communication abnormalities are detected in all said first active-system virtual paths.

7. A method according to claim 5, further comprising the step of resetting the first active-system virtual path and the first standby-system virtual path to share a band assigned to said first active-system transmission/reception section when communication abnormalities are detected in all said second active-system virtual paths.

8. A method according to claim 1, wherein the step of switching comprises the step of, when a communication abnormality occurs in one of the active-system virtual paths, limiting a band set for the remaining normal active-system virtual paths and using a surplus band as a standby-system virtual path.

9. A method according to claim 1, wherein the method further comprises
the step of setting a plurality of active-system virtual paths and a plurality of standby-system virtual paths, and
the step of switching further comprises the step of switching active-system virtual paths, except for an active-system virtual path assigned to a specific subscriber terminal for which no protection is required, to standby-system virtual paths, except for a standby-system virtual path assigned to said specific subscriber terminal, in the event of communication abnormalities in the active-system virtual paths except for the active-system virtual path assigned to said specific subscriber terminal.

10. A method according to claim 1, wherein the method further comprises the steps of:
setting a plurality of active-system virtual paths between said subscriber terminal and a plurality of first transmission/reception means corresponding to said active-system transmission/reception section; and
setting a standby-system virtual path between said subscriber terminal and second transmission/reception means corresponding to said standby-system transmission/reception section, and
the step of switching comprises the step of, when an abnormality is detected in an active-system virtual path, switching the active-system virtual path in which the abnormality is detected to a standby-system virtual path by using a band held by said second transmission/reception means.

11. A method according to claim 1, wherein said step of transmitting transmits an ATM (Asynchronous Transmission Mode) cell to one of a plurality of ports, to which said first active-system transmission/reception section and said first standby-system transmission/reception section are connected, in accordance with a header added to the ATM cell.

12. A method according to claim 1, wherein said step of transmitting transmits a data cell to one of a plurality of ports, which said first active-system transmission/reception section and said first standby-system transmission/reception section are connected, in a synchronous transfer mode in accordance with a time slot of a frame.

13. A protection switching apparatus for a passive optical network (PON) system characterized by comprising:
an optical line terminal having a first active-system transmission/reception section and a first standby-system transmission/reception section for transmitting/receiving signals and detecting communication abnormalities in transmission paths;
a plurality of network units each having a second active-system transmission/reception section and a second standby-system transmission/reception section respectively connected to said first active-system transmission/reception section and said standby-system transmission/reception section through the transmission paths, said network units being star-connected to said optical line terminal through the transmission paths and active-system virtual paths and standby-system virtual paths between said optical line terminal and said subscriber terminal are set in different time slot bands;
selectors which are respectively arranged in said network units to select said second active-system transmission/reception section and said second standby-system transmission/reception section connected to normal transmission paths, one of said selected second active-system transmission/reception section and said selected second standby-system transmission/reception section being connected to subscriber terminals;

a switch which is arranged in said optical line terminal to establish a virtual path between said optical line terminal and said network unit by switching and connecting the transmission path between said first active-system transmission/reception section and said first standby-system transmission/reception, said switch outputs a data cell to one of a plurality of ports in the network units, to which said first active-system transmission/reception section and said first standby-system transmission/reception section are connected, in accordance with one of a header value added to the data cell or a time slot of a frame; and a first control section which is arranged in said optical line terminal to control said switch, upon detection of a communication abnormality in the transmission path, so as to switch only the abnormal transmission path to a normal transmission path without affecting communication through other active virtual paths in the PON system, thereby reestablishing a virtual path to said subscriber terminal in which the communication abnormality has occurred, the virtual path being constituted by an active-system virtual path and a standby-system virtual path.

14. An apparatus according to claim 13, wherein the transmission path is formed from a metal line.

15. An apparatus according to claim 13, wherein the transmission path is formed from a coaxial cable.

16. An apparatus according to claim 13, wherein the transmission path is an optical transmission path, and said network unit is an optical network unit.

17. An apparatus according to claim 16, wherein the optical transmission paths respectively star-connect said second active-system transmission/reception section and said second standby-system transmission/reception section to said first active-system transmission/reception section and said first standby-system transmission/reception section through photocouplers.

18. An apparatus according to claim 13, wherein said switch outputs an ATM (Asynchronous Transmission Mode) cell to one of a plurality of ports, to which said first active-system transmission/reception section and said first standby-system transmission/reception section are connected, in accordance with a header value added to the ATM cell.

19. An apparatus according to claim 13, wherein said switch determines an output port for data in a synchronous transfer mode in accordance with a time slot of a frame.

20. An apparatus according to claim 13, wherein said network units transmit warning signals indicating communication abnormalities in the transmission paths, and said first control section switches/controls all ports of said switch to simultaneously switch virtual paths between said optical line terminal and said subscriber terminals from active-system virtual paths to standby-system virtual paths upon simultaneously receiving the warning signals from said network units.

21. An apparatus according to claim 13, wherein said network units which have accessed signals distributed from said optical line terminal transmit warning signals indicating communication abnormalities in the transmission paths, and said first control section switches/controls predetermined ports of said switch to simultaneously switch virtual paths between said optical line terminal and said subscriber terminals from active-system virtual paths to standby-system virtual paths upon simultaneously receiving the warning signals from said network units.

22. An apparatus according to claim 13, wherein said first control section transmits a selector switching signal to said network unit when a communication abnormality is detected in the transmission path, and said network unit comprises a second control section for controlling said selector to selectively switch said second active-system transmission/reception section and said second standby-system transmission/reception section upon reception of the selector switching signal from said optical line terminal.

23. An apparatus according to claim 13, wherein the virtual path comprises a plurality of first active-system virtual paths running through said first and second transmission/reception sections, a plurality of second active-system virtual paths running through said first and second standby-system transmission/reception sections, a first standby-system virtual path running through said first and second active-system transmission/reception sections, and a second standby-system virtual path running through said first and second standby-system transmission/reception sections, the first and second active-system virtual paths and the first and second standby-system virtual paths being set in different bands, and said first control section controls said switch to switch the virtual path to one of the first and second standby-system virtual paths when a communication abnormality is detected in one of the first and second active-system virtual paths.

24. An apparatus according to claim 23, wherein when communication abnormalities are detected in all the first active-system virtual paths, a second active-system virtual path and a second standby-system virtual path are reset to share a band assigned to said first standby-system transmission/reception section.

25. An apparatus according to claim 23, wherein when communication abnormalities are detected in all the second active-system virtual paths, a first active-system virtual path and a first standby-system virtual path are reset to share a band assigned to said first active-system transmission/reception section.

26. An apparatus according to claim 13, wherein when a communication abnormality is detected in an active-system virtual path, a band set for remaining normal active-system virtual paths is limited, and a surplus band is used as a standby-system virtual path.

27. An apparatus according to claim 13, wherein a plurality of active-system virtual paths and a plurality of standby-system virtual paths are set, and said first control section controls said switch, in the event of communication abnormalities in active-system virtual paths except for an active-system virtual path assigned to a specific subscriber terminal for which no protection is required, so as to switch, the active-system virtual-paths in which the communication abnormalities have occurred to standby-system virtual paths except for a standby-system virtual path assigned to said specific subscriber terminal.

28. An apparatus according to claim 13, wherein a plurality of active-system virtual paths are set between said subscriber terminals and a plurality of first transmission/reception means corresponding to said active-system transmission/reception sections, a standby-system virtual path forming a virtual path is set between said subscriber terminal and second transmission/reception means corresponding to said standby-system transmission/reception section, and when an abnormality is detected in an active-system virtual path, the active-system virtual path in which the abnormality has been detected is switched to a standby-system virtual path by using a band held by said second transmission/reception means.

* * * * *